US008957143B2

(12) United States Patent
Balfour

(10) Patent No.: US 8,957,143 B2
(45) Date of Patent: *Feb. 17, 2015

(54) IMPACT-RESISTANT POLY(ARYLENE ETHER) RESINS WITH IMPROVED CLARITY

(71) Applicant: SABIC Innovative Plastics IP B.V., Bergen op Zoom (NL)

(72) Inventor: Kim G. Balfour, Delanson, NY (US)

(73) Assignee: SABIC Global Technologies B.V. (NL)

( * ) Notice: Subject to any disclaimer, the term of this patent is extended or adjusted under 35 U.S.C. 154(b) by 183 days.

This patent is subject to a terminal disclaimer.

(21) Appl. No.: 13/693,076

(22) Filed: Dec. 4, 2012

(65) Prior Publication Data
US 2013/0164476 A1 Jun. 27, 2013

Related U.S. Application Data

(63) Continuation-in-part of application No. 13/153,067, filed on Jun. 3, 2011, now Pat. No. 8,703,852.

(51) Int. Cl.
C08L 71/00 (2006.01)
C08L 53/02 (2006.01)
C08L 53/00 (2006.01)
C08J 3/20 (2006.01)
C08L 71/12 (2006.01)

(52) U.S. Cl.
CPC ............... C08L 71/00 (2013.01); C08L 53/02 (2013.01); C08L 53/00 (2013.01); C08J 3/203 (2013.01); C08L 71/12 (2013.01); C08J 2371/12 (2013.01); C08L 2205/02 (2013.01); C08L 2205/03 (2013.01)
USPC .......................... 524/128; 428/36.92; 524/359

(58) Field of Classification Search
CPC .................................. C08L 71/00; C08L 53/02
USPC ........................................................ 524/128
See application file for complete search history.

(56) References Cited

U.S. PATENT DOCUMENTS

| | | | |
|---|---|---|---|
| 3,281,383 A | 10/1966 | Zelinski et al. | |
| 3,306,874 A | 2/1967 | Hay | |
| 3,639,517 A | 2/1972 | Kitchen et al. | |
| 3,660,531 A | 5/1972 | Lauchlan et al. | |
| 4,180,530 A | 12/1979 | Bi et al. | |
| 5,234,944 A | 8/1993 | Clemence et al. | |
| 5,434,220 A | 7/1995 | Yoshimura et al. | |
| 6,127,487 A | 10/2000 | Ahmed et al. | |
| 6,274,670 B1 | 8/2001 | Adedeji et al. | |
| 6,576,700 B2 | 6/2003 | Patel | |
| 7,576,150 B2 | 8/2009 | Klei et al. | |
| 7,585,906 B2 | 9/2009 | Klei et al. | |
| 7,622,522 B2 | 11/2009 | Qiu et al. | |
| 7,847,032 B2 | 12/2010 | Guo et al. | |
| 2003/0096123 A1 | 5/2003 | Yeager | |
| 2007/0112132 A1 | 5/2007 | Zhao et al. | |
| 2008/0045656 A1 | 2/2008 | Balfour et al. | |
| 2008/0206449 A1 | 8/2008 | Klei et al. | |
| 2008/0251271 A1 | 10/2008 | Jeyakumar et al. | |
| 2009/0211967 A1 | 8/2009 | Delsmann et al. | |
| 2010/0012373 A1 | 1/2010 | Guo et al. | |
| 2010/0122845 A1 | 5/2010 | Guo et al. | |
| 2010/0139944 A1 | 6/2010 | Guo et al. | |
| 2011/0266024 A1 | 11/2011 | Qiu et al. | |

FOREIGN PATENT DOCUMENTS

| | | |
|---|---|---|
| EP | 1512725 A1 | 3/2005 |
| WO | 8102020 A1 | 7/1981 |
| WO | 2008021629 A1 | 2/2008 |
| WO | 2010030478 A2 | 3/2010 |

OTHER PUBLICATIONS

International Search Report dated Feb. 25, 2014; International Application No. PCT/US2013/071646 filed Nov. 25, 2013; 5 pages.
Written Opinion dated Feb. 25, 2014; International Application No. PCT/US2013/071646; Application Filing Date Nov. 25, 2013; 4 pages.
International Search Report for International Application No. PCT/US2012/039047, International Filing Date May 23, 2012, Date of Mailing Dec. 26, 2012, 5 pages.
Written Opinion for International Application No. PCT/US2012/039047, International filing date May 23, 2012, Date of mailing Dec. 26, 2012, 6 pages.
U.S. Appl. No. 13/153,067, filed Jun. 3, 2011.
U.S. Appl. No. 13/626,953, filed Sep. 26, 2012.
U.S. Appl. No. 13/693,066, filed Dec. 4, 2012.
Gachter and Muller, EDs, "Plastics Additives Handbook; Stabilizers, Processing Aids, Plasticizers, Fillers, Reinforcements, Colorants for Thermoplastics, 3rd Edition", New York: Hanser Publishers, 1990, in Chapter 9, "Fillers and Reinforcements", by H. P. Schlumpf.
Kuraray SEPTON S2104 Thermoplastic Rubber, Information Sheet, downloaded from http://www.matweb.com/search/datasheet.aspx?matguid=fde7a35f9f574598bc6b726914d13da&ckck=1[Jun. 5, 2012 6:44:40 AM] on Jun. 5, 2012, 2 pages.
International Search Report; International Application No. PCT/US2012/067829; International Filing Date Dec. 5, 2012; 6 pages.
Written Opinon of the International Searching Authority; International Application No. PCT/US2012/067829; International Filing Date Dec. 5, 2012; 5 pages.

Primary Examiner — Doris Lee
(74) Attorney, Agent, or Firm — Cantor Colburn LLP

(57) ABSTRACT

The present invention is directed to a composition that includes a poly(arylene ether), a radial block copolymer of an alkenyl aromatic monomer and a conjugated diene, a linear block copolymer of an alkenyl aromatic monomer and a conjugated diene, one or more optical enhancing agents, and a hydrocarbon resin. The composition is characterized by at least one of the following properties: a multiaxial impact of at least 20 joules as measured by ASTM D 3763-08, a percent haze of 15 percent or less as measured by ASTM D 1003-00, and a percent transmittance of 75 percent or more as measured by ASTM D 1003-00.

40 Claims, No Drawings

IMPACT-RESISTANT POLY(ARYLENE ETHER) RESINS WITH IMPROVED CLARITY

CROSS-REFERENCE TO RELATED APPLICATIONS

This application is a continuation-in-part of U.S. patent application Ser. No. 13/153,067, filed Jun. 3, 2011, which is incorporated herein by reference in its entirety.

BACKGROUND OF THE INVENTION

Compositions containing poly(arylene ether)s and styrenic block copolymers are known and valued for their improved properties relative to either resin type alone. For example, U.S. Pat. No. 3,660,531 (Lauchlan) describes blends of polyphenylene ethers with styrene-butadiene block copolymers and teaches that the blends exhibit improved melt processability and impact resistance without sacrificing the desirable heat distortion temperature and flexural modulus of unmodified polyphenylene ether. As another example, U.S. Pat. No. 5,234,994 (Shiraki et al.) describes blends of a polyphenylene ether, a block copolymer of a vinyl aromatic hydrocarbon and a conjugated diene, and polystyrene. The blends are described as offering improved transparency, impact resistance, surface hardness, heat resistance, and gloss. As yet another example, U.S. Pat. No. 6,274,670 (Adedeji et al.) describes a composition comprising a polyphenylene ether resin, a non-elastomeric styrenic resin, and an unsaturated elastomeric styrenic block copolymer. When the non-elastomeric styrenic resin is a styrene-butadiene block copolymer having at least 50 weight percent styrene, these compositions are semi-transparent and exhibit enhanced processability.

Despite these advances, light color, low haze, impact-resistant, and flame-retardant poly(arylene ether)s remain an elusive target. Although optical enhancing agents along with flame-retardants can give resins with improved clarity and less haze, they also lead to resins with reduced impact resistance scores relative to resins without these additives.

There is therefore a need in the packaging and healthcare industries, among others, for poly(arylene ether) blends that exhibit an improved balance of optical clarity and impact resistance.

SUMMARY OF THE INVENTION

Resins with both high levels of optical clarity and impact resistance can be prepared using impact modifiers, even in the presence of other additives that are known to reduce impact resistance. The impact modifiers include a radial block copolymer and a linear block copolymer. The additional use of hydrogenated hydrocarbon or terpene resins in the blends resulted in significant improvement in multiaxial impact scores even in the presence of other additives such as benzoin, tridecyl phosphite, and resorcinol bis(diphenyl phosphate), and maintained low levels of haze and high percents of light transmittance in the product resins. Thus, the present invention is directed to a composition comprising:

(a) a poly(arylene ether);

(b1) a radial block copolymer of an alkenyl aromatic monomer and a conjugated diene; wherein the radial block copolymer has about 50 to about 70 weight percent of repeating units derived from the alkenyl aromatic monomer and a number average molecular weight of about 50,000 to about 70,000 atomic units;

(b2) a linear block copolymer of an alkenyl aromatic monomer and a conjugated diene; wherein the linear block copolymer has about 55 to about 70 weight percent of repeating units derived from the alkenyl aromatic monomer; wherein the ratio of (b1) to (b2) is 0.5:1 to 4:1;

(c) one or more optical enhancing agents; and (d) a hydrocarbon resin selected from the group consisting of hydrogenated alicyclic hydrocarbon resins and hydrogenated terpene resins;

wherein the composition is characterized by at least one of the following properties:

(i) a multiaxial impact of at least 20 J as measured by ASTM D 3763-08;

(ii) a percent haze of 15 percent or less as measured by ASTM D 1003-00; and (iii) a percent transmittance of 75 percent or more as measured by ASTM D 1003-00.

The invention is further directed to processes for making such compositions, and for articles that are formed from such compositions.

DETAILED DESCRIPTION OF THE INVENTION

All cited patents, patent applications, and other references are incorporated herein by reference in their entirety. However, if a term in the present application contradicts or conflicts with a term in the incorporated reference, the term from the present application takes precedence over the conflicting term from the incorporated reference. All ranges disclosed herein are inclusive of the endpoints, and the endpoints are independently combinable with each other. The use of the terms "a" and "an" and "the" and similar referents in the context of describing the invention (especially in the context of claims) are to be construed to cover both the singular and the plural, unless otherwise indicated herein or clearly contradicted by context. It should further be noted that the terms "first," "second," and the like herein do not denote any order, quantity, or importance, but rather are used to distinguish one element from another. The modifier "about" used in connection with a quantity is inclusive of the stated value and has the meaning dictated by the context (that is, it includes the degree of error associated with measurement of the particular quantity). As used herein weight percents are based on a 100 weight percent composition.

Components (a) Poly(arylene ether)

The composition comprises a poly(arylene ether). In some embodiments, the poly(arylene ether) used to form the composition comprises repeating structural units of the formula

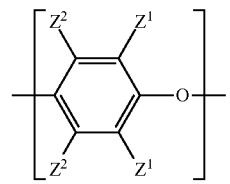

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(arylene ether) can comprise molecules having aminoalkyl-containing end group(s), typically located in an ortho position to the hydroxy group. Also frequently present are tetramethyldiphenoquinone (TMDQ) end groups, typically obtained from reaction mixtures in which tetramethyldiphenoquinone by-product is present. In some embodiments the poly(arylene ether) comprises TMDQ end groups in an amount of less than 5 weight percent, specifically less than 3 weight percent, more specifically less than 1 weight percent, based on the weight of the poly(arylene ether). In some embodiments, the poly(arylene ether) comprises, on average, about 0.7 to about 2 moles, specifically about 1 to about 1.5 moles, of chain-terminal hydroxyl groups per mole of poly (arylene ether).

The poly(arylene ether) can be in the form of a homopolymer, a copolymer, a graft copolymer, an ionomer, or a block copolymer, as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units. In some embodiments, the poly(arylene ether) is an unfunctionalized poly(arylene ether). An unfunctionalized poly(arylene ether) is a poly(arylene ether) consisting of the polymerization product of one or more phenols. The term "unfunctionalized poly(arylene ether)" excludes functionalized poly(arylene ether)s such as acid-functionalized poly(arylene ether)s and anhydride-functionalized poly (arylene ether)s. In some embodiments, the poly(arylene ether) comprises a poly(2,6-dimethyl-1,4-phenylene ether).

The poly(arylene ether) can be prepared by the oxidative coupling of monohydroxyaromatic compound(s) such as 2,6-xylenol and/or 2,3,6-trimethylphenol. Catalyst systems are generally employed for such coupling. They can contain heavy metal compounds such as copper, manganese, or cobalt compounds, usually in combination with one or more ligands such as a primary amine, a secondary amine, a tertiary amine, a halide, or a combination of two or more of the foregoing.

In some embodiments, the poly(arylene ether) has an intrinsic viscosity of about 0.2 to about 1.0 deciliter per gram, as measured by Ubbelohde viscometer in chloroform at 25° C. In some embodiments, the poly(arylene ether) has an intrinsic viscosity of about 0.3 to about 0.6 deciliter per gram. When the poly(arylene ether) is a poly(2,6-dimethyl-1,4-phenylene ether), the intrinsic viscosity range of about 0.3 to about 0.6 deciliter per gram can correspond to a number average molecular weight range of about 16,000 to about 25,000 atomic mass units.

In some embodiments, the composition comprises less than or equal to 2 weight percent, specifically less than or equal to 1 weight percent, more specifically less than or equal to 0.5 weight percent, of a poly(arylene ether)-polysiloxane block copolymer. In some embodiments, the composition excludes poly(arylene ether)-polysiloxane block copolymer. Poly(arylene ether)-polysiloxane block copolymers, which comprise at least one poly(arylene ether) block and at least one polysiloxane block, are described, for example, in U.S. Patent Application Publication No. US 2010/0139944 A1 (Guo et al.).

In some embodiments, the poly(arylene ether) is characterized by a weight average molecular weight and a peak molecular weight, wherein a ratio of the weight average molecular weight to the peak molecular weight is about 1.3:1 to about 4:1. Within this range, the ratio can be about 1.5:1 to about 3:1, specifically about 1.5:1 to about 2.5:1, more specifically about 1.6:1 to about 2.3:1, still more specifically 1.7:1 to about 2.1:1. As used herein, the term "peak molecular weight" is defined as the most commonly occurring molecular weight in the molecular weight distribution. In statistical terms, the peak molecular weight is the mode of the molecular weight distribution. In practical terms, when the molecular weight is determined by a chromatographic method such as gel permeation chromatography, the peak molecular weight is the poly(arylene ether) molecular weight of the highest point in a plot of molecular weight on the x-axis versus absorbance on the y-axis.

In some embodiments, the poly(arylene ether) is essentially free of incorporated diphenoquinone residues. "Diphenoquinone residues" means the dimerized moiety that may form in the oxidative polymerization reaction giving rise to the poly(arylene ethers) contemplated for use in the present invention. As described in U.S. Pat. No. 3,306,874 (Hay), synthesis of poly(arylene ether)s by oxidative polymerization of monohydric phenols yields not only the desired poly (arylene ether) but also a diphenoquinone side product. For example, when the monohydric phenol is 2,6-dimethylphenol, 3,3',5,5'-tetramethyldiphenoquinone (TMDQ) is generated. Typically, the diphenoquinone is "re-equilibrated" into the poly(arylene ether) (i.e., the diphenoquinone is incorporated into the poly(arylene ether) structure) by heating the polymerization reaction mixture to yield a poly(arylene ether) comprising terminal or internal diphenoquinone residues. As used herein, "essentially free" means that fewer than 1 weight percent of poly(arylene ether) molecules comprise the residue of a diphenoquinone as measured by nuclear magnetic resonance spectroscopy (NMR) (Mole of TMDQ× Molecular Weight of unit TMDQ)/(Mole of Polymer×Number Average Molecular Weight (Mn)). In some embodiments, fewer than 0.5 weight percent of poly(arylene ether) molecules comprise the residue of a diphenoquinone.

For example, as shown in the following Scheme, when a poly(arylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly (arylene ether) with terminal and internal residues of incorporated diphenoquinone.

Scheme

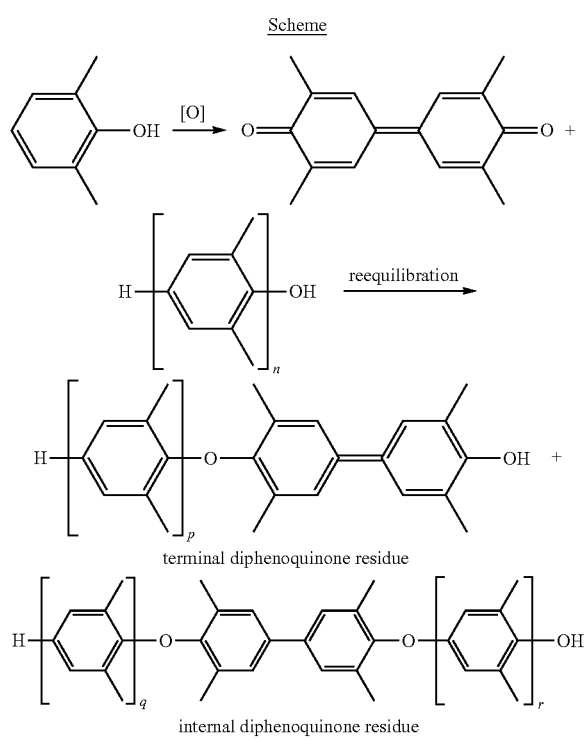

terminal diphenoquinone residue internal diphenoquinone residue

However, such re-equilibration reduces the molecular weight of the poly(arylene ether) (e.g., p and q+r are less than n). Accordingly, when a higher molecular weight and stable molecular weight poly(arylene ether) is desired, it may be desirable to separate the diphenoquinone from the poly (arylene ether) rather than re-equilibrating the diphenoquinone into the poly(arylene ether) chains. Such a separation can be achieved, for example, by precipitation of the poly (arylene ether) in a solvent or solvent mixture in which the poly(arylene ether) is insoluble and the diphenoquinone is soluble with very minimum time between end of reaction and precipitation.

For example, when a poly(arylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or methanol water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the re-equilibration of the diphenoquinone into the poly(arylene ether) chain can be minimized (e.g., by isolating the poly(arylene ether) no more than 200 minutes after termination of oxidative polymerization). These approaches are described in International patent application Ser. No. 12/255,694, published as United States Published Application 2009/0211967 (Delsman et. al.). Alternatively, diphenoquinone amounts can be achieved by removing the TMDQ formed during polymerization by filtration, specifically after stopping the oxygen feed into the polymerization reactor.

In some embodiments, the poly(arylene ether) is a poly (phenylene ether).

(b) Radial Block Copolymer (b1) and Linear Block Copolymer (b2)

In addition to the poly(arylene ether), the composition comprises a radial block copolymer and a linear block copolymer, both of which may be hydrogenated.

The radial and linear block copolymers may both be prepared from an alkenyl aromatic monomer and a conjugated diene.

(b1) Radial Block Copolymer (b1)

As used herein, the term "radial block copolymer" refers to a branched polymer comprising poly(conjugated diene) blocks, poly(alkenyl aromatic) blocks, and the residue of a coupling agent that acts as a branching point or radius of the radial block copolymer. More particularly, in the radial block copolymer structure, multiple chains of the poly(conjugated diene) polymer, usually three or more, are each covalently bound at one end to the residue of a coupling agent and covalently bound at the other end to a block of the poly (alkenyl aromatic). In some embodiments, the radial block copolymer consists of the poly(conjugated diene) blocks, the poly(alkenyl aromatic) blocks, and the residue of the coupling agent. For example, the radial block copolymer may exclude residues derived from other polymerizable monomers.

The alkenyl aromatic monomer used to form the radial block copolymer may have the structure

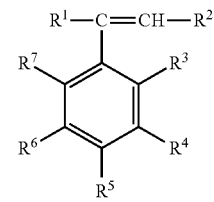

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$-$R^6$ each independently represent a hydrogen atom, a $C_1$-$C_8$ alkyl group, or a $C_2$-$C_8$ alkenyl group; or $R^3$ and $R^4$ are taken together with the central aromatic ring to form a naphthyl group, or $R^4$ and $R^5$ are taken together with the central aromatic ring to form a naphthyl group. Suitable alkenyl aromatic monomers include, for example, styrene, chlorostyrenes such as p-chlorostyrene, methylstyrenes such as alpha-methylstyrene and p-methylstyrene, and combinations thereof. In some embodiments, the alkenyl aromatic monomer is styrene.

The conjugated diene used to form the radial block copolymer may be, for example, 1,3-butadiene, 2-methyl-1,3-butadiene, 2-chloro-1,3-butadiene, 2,3-dimethyl-1,3-butadiene, 1,3-pentadiene, 1,3-hexadiene, and combinations thereof. In some embodiments, the conjugated diene is 1,3-butadiene. In some embodiments, the conjugated diene is 2-methyl-1,3-butadiene (isoprene).

The coupling agent may be any compound capable of joining at least three block copolymers. Examples of such compounds are multivinyl aromatic compounds; multiepoxide compounds (including epoxidized soybean oils); multiisocyanate compounds; multiimine compounds; multialdehyde compounds; multiketone compounds; multihalides; multianhydride compounds; and multiester compounds. The amount of coupling agent is typically about 0.1 to about 1 weight percent based on the weight of the total composition.

The radial block copolymer has about 50 to about 70 weight percent of repeating units derived from the alkenyl aromatic monomer. Within this range, the alkenyl aromatic content can be 65 to 70 weight percent. Poly(alkenyl aromatic) content can be determined by proton nuclear magnetic resonance spectroscopy ($^1$H NMR).

The radial block copolymer has a number average molecular weight of about 50,000 to about 70,000 atomic mass units. Within this range, the number average molecular weight can be 57,000 to 67,000 atomic mass units. In some embodiments, the radial block copolymer has a weight average molecular weight of 130,000 to 170,000 atomic mass units, specifically 140,000 to 160,000 atomic mass units. In some embodiments, the radial block copolymer has a polydispersity (weight average molecular weight divided by number average molecular weight) of 1.94 to 2.98.

A gel permeation chromatography method for determining the molecular weight characteristics is as follows. A 20 milligram sample of block copolymer is dissolved in 20 milliliters chloroform with 2 parts per thousand by weight toluene (as a flow marker). After the block copolymer is dissolved, the sample is ready to be analyzed by gel permeation chromatography with detection at 254 nanometers. The chromatography equipment includes a Hewlett Packard HPLC 1100 series chromatograph equipped with a PL gel 5 micrometer*$10^3$ Å column, a PL gel 5 micrometer*$10^5$ Å column, and a 500 Å Styragel packing pre-column. The columns are maintained at 35° C. during the analysis. The injection volume is 75 microliters, and injection samples are pre-filtered through a 0.45 micrometer "greenband" filter. The eluent is chloroform and the run time is 16 minutes. Data in the polystyrene molecular weight range of 2,000 to 1,000,000 atomic mass units (AMU) is used to calculate values of number average molecular weight and weight average molecular for the block copolymers. The analysis is calibrated with polystyrene monodisperse calibration standards, such as Polymer Laboratories Easivial Standards Part No. PL12541A.

In some embodiments, the radial block copolymer is not hydrogenated. ("unhydrogenated"). Specifically, residual aliphatic unsaturation in the poly(conjugated diene) block resulting from polymerization of the conjugated diene is not reduced by hydrogenation.

In some embodiments, the radial block copolymer is less than 5 percent crosslinked, based on the total number of aliphatic carbon-carbon double bonds in the radial block copolymer. Specifically, the radial block copolymer is not intentionally crosslinked by treatment with radiation or chemical agents capable of forming covalent crosslinks between the poly(conjugated diene) blocks of different radial block copolymer molecules.

Methods of preparing radial block copolymers are known in the art and include the methods described in, for example, U.S. Pat. No. 3,281,383 (Zelinski et al.), U.S. Pat. No. 3,639,517 (Kitchen et al.), U.S. Pat. No. 4,180,530 (Bi et al.), and U.S. Pat. No. 6,127,487 (Ahmed et al). Radial block copolymers are also commercially available as K-Resin from Chevron Phillips Chemical Company, including KK38, KR01, KR03, and KR05.

In some embodiments, the radial block copolymer has a polystyrene content of 65 to 70 weight percent, a polybutadiene content of 30 to 35 weight percent, a number average molecular weight of 57,000 to 67,000 atomic mass units, a weight average molecular weight of 130,000 to 170,000 atomic mass units, and a polydispersity of 1.94 to 2.98. In some embodiments, this radial block copolymer comprises a first polystyrene block with a first number average molecular weight and a second polystyrene block with a second number average molecular weight that is at least two times the first number average molecular weight. Radial block copolymers described in this paragraph can be prepared according to the method of U.S. Pat. No. 3,281,383 to Kitchen et al. In some embodiments, the radial block copolymer has 20 to 30 weight percent of the residue of 1,4-addition of butadiene, and 2 to 12 weight percent of the residue of 1,2-addition of butadiene (both based on the weight of the radial block copolymer), and a ratio of 1,4-addition to 1,2-addition of 2.5:1 to 5:1. In some embodiments of the radial block copolymer, among the residue of 1,4-addition of butadiene the ratio of cis to trans double bonds is 1:1 to 2:1. A suitable example of such a radial block copolymer is K-RESIN KK38 from Chevron Phillips, having a polystyrene content of about 68 weight percent, a polybutadiene content of about 32 weight percent, a number average molecular weight of about 63,000, a weight average molecular weight of about 149,000, a polydispersity of about 2.4, and a melt flow rate of about 9 grams per 10 minutes measured at 200° C. and 5 kilograms load according to ASTM D1238-10. K-RESIN KK38 has about 25 weight percent of the residue of 1,4-addition of butadiene, and about 7 weight percent of the residue of 1,2-addition of butadiene, corresponding to a ratio of 1,4-addition to 1,2-addition of about 3.6:1. Among the residue of 1,4-addition of butadiene, the ratio of cis to trans double bonds is about 1.4:1. The weight percents of residues of 1,2-addition of butadiene and 1,4-addition of butadiene, as well as the ratio of cis to trans double bonds in the residue of 1,4-addition of butadiene, can be determined by $^1$H NMR.

(b2) Linear Block Copolymer (b2)

The alkenyl aromatic monomer used to prepare the linear block copolymer can have the same structure as the radial block copolymer. The conjugated diene used to prepare the hydrogenated block copolymer can be the same as provided for the radial block copolymer. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

The linear block copolymer is a copolymer comprising (A) at least one block derived from an alkenyl aromatic compound and (B) at least one block derived from a conjugated diene, in which the aliphatic unsaturated group content in the block B is at least partially reduced by hydrogenation. In some embodiments, the aliphatic unsaturation in the B block is reduced by about 55 percent to about 70 percent. The arrangement of blocks A and B includes a linear structure. Linear block copolymers include tapered linear structures and non-tapered linear structures. In some embodiments, the linear block copolymer has a tapered linear structure. In some embodiments, the linear block copolymer has a non-tapered linear structure. In some embodiments, the linear block copolymer comprises a B block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B, wherein the molecular weight of each A block may be the same as or different from that of other A blocks, and the molecular weight of each B block may be the same as or different from that of other B blocks. In some embodiments, the linear block copolymer is a diblock copolymer, a triblock copolymer, or a combination thereof.

In some embodiments, the linear block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms.

In some embodiments, the linear block copolymer includes the residue of one or more acid functionalizing agents, such as maleic anhydride.

In some embodiments, the linear block copolymer comprises a polystyrene-poly(ethylene-butylene)-polystyrene triblock copolymer.

In some embodiments, the linear block copolymer comprises a polystyrene-poly(ethylene-butylene-styrene)-polystyrene triblock copolymer.

In some embodiments, the linear block copolymer comprises a polystyrene-poly(ethylene-butylene-styrene)-polystyrene triblock copolymer and a polystyrene-poly(ethylene-butylene)-polystyrene triblock copolymer.

In some embodiments, the linear block copolymer is a block copolymer of an alkenyl aromatic monomer and a conjugated diene, wherein the linear block copolymer has about 55 to about 70 weight percent of repeating units derived from the alkenyl aromatic monomer.

In some embodiments, the linear block copolymer is a polystyrene-poly(ethylene-butylene)-polystyrene triblock copolymer having about 65 to about 70 weight percent of repeating units derived from styrene. An example of such a linear block copolymer is Asahi TUFTEC H1043. In some embodiments, the ratio of (b1) to (b2) is from 1.5:1 to 2.5:1.

In some embodiments, the radial block copolymer is a block copolymer of styrene and butadiene having about 65 to about 70 weight percent of repeating units derived from styrene (e.g., Chevron Phillips KK38), and the linear block copolymer is a polystyrene-poly(ethylene-butylene)-polystyrene triblock copolymer having about 65 to about 70 weight percent of repeating units derived from styrene (e.g., Asahi TUFTEC H1043).

In some embodiments, the weight percent of (b1) in the composition of the invention is less than the weight percent of (b2). In other embodiments, the weight percent of (b1) in the composition of the invention is greater than the weight percent of (b2).

In some embodiments, the ratio of (b1) in the composition to (b2) is 0.5:1 to 4:1. In some embodiments, the weight percent ratio of (b1) in the composition to (b2) is 1:1 to 3:1. In other embodiments, the weight percent ratio of (b1) in the composition to (b2) is 1.5:1 to 2.5:1. In other embodiments, the weight percent ratio of (b1) in the composition to (b2) is 1.75:1 to 2.25:1. In other embodiments, the weight percent ratio of (b1) in the composition to (b2) is 1.9:1 to 2.1:1. In other embodiments, the weight percent ratio of (b1) in the composition to (b2) is 2:1.

(c) Optical Enhancing Agent

The optical properties of the composition comprising the poly(arylene ether) and block copolymers may be enhanced by the addition of certain additives. Thus, the composition may also comprise at least one optical enhancing agent. The optical enhancing agent, which decolorizes the composition, is selected from the group consisting of alpha-hydroxyketones, unsubstituted or substituted trihydrocarbyl phosphites, and carboxylic acid compounds of formula (I), (II), or (III)

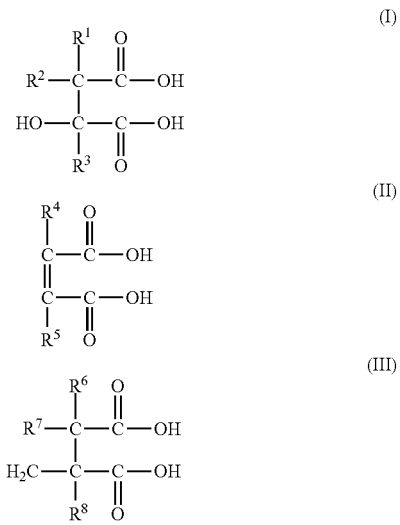

and their hydrates and anhydrides, wherein $R^1$, $R^2$, $R^3$, $R^4$, $R^5$, $R^6$, $R^7$, and $R^8$ are each independently selected from the group consisting of hydrogen and $C_1$-$C_{12}$ hydrocarbyl optionally substituted with one or more substituents selected from hydroxy (—OH), ketone (—C(=O)—), etheric oxygen (—O—), and carboxylic acid (—CO$_2$H). The optional divalent ketone and etheric oxygen substituents may be incorporated into the backbone or substituents of formulae (I), (II), or (III).

Alpha-hydroxyketones have the general formula

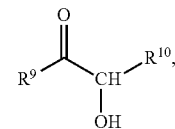

wherein $R^9$ is $C_1$-$C_{12}$ hydrocarbyl, optionally substituted with hydroxy or ketone groups; and $R^{10}$ is hydrogen or $C_1$-$C_{12}$ hydrocarbyl, optionally substituted with hydroxy or ketone groups. Suitable alpha-hydroxyketones include, for example, hydroxyacetone (1-hydroxy-2-propanone; Chemical Abstracts Service (CAS) Reg. No. 116-09-6), acetoin (3-hydroxy-2-butanone; CAS Reg. No. 513-86-0), 2-hydroxyacetophenone (CAS Reg. No. 528-24-1), benzoin (2-hydroxy-2-phenylacetophenone, CAS Reg. No. 119-53-9), 2-hydroxy-1-phenyl-2-p-tolyl-ethanone (CAS Reg. No. 2431-02-9), and the like, and combinations thereof.

Trihydrocarbyl phosphites may have the general structure P(OR$^{11}$)$_3$, wherein each occurrence of $R^{11}$ is independently $C_1$-$C_{18}$ hydrocarbyl. In some embodiments, each $R^{11}$ is independently $C_6$-$C_{18}$ alkyl. Suitable trihydrocarbyl phosphites include, for example, trioctyl phosphite, tridecyl phosphite (TDP), tridodecyl phosphite, phenyl didecyl phosphite, decyl diphenyl phosphite, triphenyl phosphite, tritolyl phosphites, and the like, and combinations thereof. Suitable trihydrocarbyl phosphites further include spiro diphosphites such as, for example, 3,9-bis[2,4-bis(1,1-dimethylethyl)phenoxy]-2,4,8,10-tetraoxa-3,9-diphosphaspiro[5.5]undecane (CAS Reg. No. 26741-53-7; commercially available from Ciba under the trade name IRGAFOS 126).

As mentioned and depicted above, the carboxylic acid compounds include those having formula (I), (II), or (III) and their hydrates and anhydrides, wherein $R^1, R^2, R^3, R^4, R^5, R^6, R^7$, and $R^8$ are each independently selected from the group consisting of hydrogen and $C_1$-$C_{12}$ hydrocarbyl optionally substituted with one or more substituents selected from hydroxy, ketone, etheric oxygen, and carboxylic acid. Suitable carboxylic acid compounds include, for example, aconitic acid (CAS Reg. No. 499-12-7), agaricic acid (CAS Reg. No. 666-99-9), citric acid (CAS Reg. No. 77-92-9), citraconic acid (CAS Reg. No. 498-23-7), fumaric acid (CAS Reg. No. 110-17-8), itaconic anhydride (CAS Reg. No. 2170-03-8), malic acid (CAS Reg. No. 6915-15-7), maleic acid (CAS Reg. No. 110-16-7), and the like, and combinations thereof.

In some embodiments, the composition comprises at least one of benzoin, citric acid, and TDP. In some embodiments, the composition comprises benzoin and TDP.

(d) Hydrocarbon Resin

The composition of the present invention also includes a flow promoter. In one embodiment, the flow promoter is an alicyclic hydrocarbon resin. Particularly useful are low molecular weight hydrocarbon resins derived from unsaturated $C_5$ to $C_9$ monomers. Non-limiting examples include cyclic olefins and diolefins, e.g. cyclopentene, cyclopentadiene, cyclohexene, cyclohexadiene, methyl cyclopentadiene and the like; and cyclic diolefin dienes, e.g., dicyclopentadiene, methylcyclopentadiene dimer and the like. The resins can additionally be partially or fully hydrogenated. Exemplary commercial low molecular weight hydrocarbon resins may include the following: hydrocarbon resins available from Eastman Chemical under the trademark Piccotac®; the fully hydrogenated alicyclic hydrocarbon resin based on $C_9$ monomers available from Arakawa Chemical Inc. under the trademark Arkon® and sold, depending on softening point, as Arkon® P140, P125, P115, P100, P90, P70 or the partially hydrogenated hydrocarbon resins sold as Arkon® M135, M115, M100 and M90; the fully or partially hydrogenated hydrocarbon resin available from Eastman Chemical under the tradename Regalite® and sold, depending on softening point, as Regalite® R1100, S1100, R1125, R1090 and R1010, or the partially hydrogenated resins sold as Regalite® R7100, R9100, S5100 and S7125; the hydrocarbon resins available from Exxon Chemical under the trade Escorez®, sold as the Escorez® 1000, 2000 and 5000 series, based on $C_5$ to $C_9$ feedstock and mixes thereof, or the hydrocarbon resins sold as the Escorez® 5300, 5400, and 5600 series based on cyclic and $C_9$ monomers, optionally hydrogenated.

In some embodiments, the hydrocarbon resin has a softening point of about 120 to about 155° C. measured according to ASTM E28-99 (2009).

In particular embodiments, the flow promoter is an alicyclic hydrogenated hydrocarbon resin having a softening point of about 120 to about 145° C. measured according to ASTM E28-99 (2009). Suitable examples of such resins are available under the trade name Arkon®, available from Arakawa Chemical Industries, Ltd., including Arkon P-125 and Arkon P-140.

In another embodiment, the flow promoter is a hydrogenated terpene resin. Such hydrogenated terpene resins include Clearon P, M, and K resins produced by Yasuhara Chemical Co., Ltd. In some embodiments, the hydrogenated terpene resin has a softening point of about 145 to about 155° C. measured according to ASTM E28-99 (2009). An example of such a hydrogenated terpene resins is Clearon P-150 produced by Yasuhara Chemical Co., Ltd.

(e) Flame Retardants

The composition optionally contains a flame retardant. Exemplary flame-retardant additives are desirably present in an amount at least sufficient to reduce the flammability of the polyester resin, preferably to a Underwriters Laboratory 94 (UL94) V-0 rating. The amount will vary with the nature of the resin and with the efficiency of the additive. In general, however, the amount of additive will be from 2 to 30 percent by weight.

Typical flame-retardants include halogenated flame retardants such as tetrabromobisphenol-A polycarbonate oligomer, polybromophenyl ether, brominated polystyrene, brominated BPA polyepoxide, brominated imides, brominated polycarbonate, poly(haloaryl acrylate), poly(haloaryl methacrylate), or mixtures thereof.

Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, poly(pentabromobenzyl)acrylate, oligomeric brominated carbonates, especially carbonates derived from tetrabromobisphenol A, which, if desired, are end-capped with phenoxy radicals, or with brominated phenoxy radicals, or brominated epoxy resins.

The halogenated flame retardants are typically used with a synergist, particularly inorganic antimony compounds. Such compounds are widely available or can be made in known ways. Typical, inorganic synergist compounds include $Sb_2O_5$, $Sb_2S_3$, sodium antimonate and the like. Especially preferred is antimony trioxide ($Sb_2O_3$). Synergists, such as antimony oxides, are typically used at about 0.5 to 15 by weight based on the weight percent of resin in the final composition.

In some embodiments, the composition comprises a flame retardant selected from the group consisting of an organophosphate ester, a metal dialkyl phosphinate, a nitrogen-containing flame retardant, metal hydroxides and mixtures thereof.

Exemplary organophosphate ester flame retardants include, but are not limited to, phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bis-phenols such as, for example, bisphenol A bis (diphenyl phosphate). In some embodiments, the organophosphate ester is selected from tris(alkylphenyl) phosphate (for example, CAS No. 89492-23-9 or CAS No. 78-33-1), resorcinol bis(diphenyl phosphate) (for example, CAS No. 57583-54-7), bisphenol A bis(diphenyl phosphate) (for example, CAS No. 181028-79-5), triphenyl phosphate (for example, CAS No. 115-86-6), tris(isopropylphenyl) phosphate (for example, CAS No. 68937-41-7), and mixtures of two or more of the foregoing organophosphate esters.

In some embodiments the organophosphate ester comprises a bis-aryl phosphate of Formula IV:

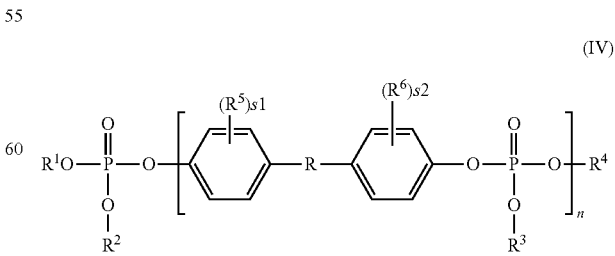

(IV)

wherein R, $R^5$ and $R^6$ are independently at each occurrence an alkyl group having 1 to 5 carbons and $R^1$-$R^4$ are independently an alkyl, aryl, arylalkyl or alkylaryl group having 1 to 10 carbons; n is an integer equal to 1 to 25; and s1 and s2 are independently an integer equal to 0 to 2. In some embodiments OR % $OR^2$, $OR^3$ and $OR^4$ are independently derived from phenol, a monoalkylphenol, a dialkylphenol or a trialkylphenol.

As readily appreciated by one of ordinary skill in the art, the bis-aryl phosphate is derived from a bisphenol. Exemplary bisphenols include 2,2-bis(4-hydroxyphenyl)propane (so-called bisphenol A), 2,2-bis(4-hydroxy-3-methylphenyl) propane, bis(4-hydroxyphenyl)methane, bis(4-hydroxy-3,5-dimethylphenyl)methane and 1,1-bis(4-hydroxyphenyl) ethane. In some embodiments, the bisphenol comprises bisphenol A.

Organophosphate esters can have differing molecular weights making the determination of the amount of different organophosphate esters used in the thermoplastic composition difficult. In some embodiments, the amount of phosphorus, as the result of the organophosphate ester, is 0.8 weight percent to 1.2 weight percent with respect to the total weight of the composition.

The amount of the flame retardant, when present in the thermoplastic composition, is sufficient for the covered conductor to pass the relevant flame retardance standard to the type of covered conductor. For example, when the covered conductor is an covered conductor the amount of flame retardant is sufficient for the covered conductor to have a flame out time less than or equal to 70 seconds, when tested according to the flame propagation procedure contained in the International Organization for Standardization (ISO) 6722.

In some embodiments, the flame retardant comprises an organophosphate ester present in an amount of 5 to 30 weight percent weight percent, with respect to the total weight of the composition. Within this range the amount of organophosphate ester can be greater than or equal to 7 weight percent, or more specifically, greater than or equal to 10 weight percent. Also within this range the amount of organophosphate ester can be less than or equal to 25 weight percent, or, more specifically, less than or equal to 20 weight percent.

(f) Other Additives

The composition may optionally further comprise one or more additives. Such additives include, for example, stabilizers, mold release agents, processing aids, flame retardants, drip retardants, nucleating agents, UV blockers, dyes, pigments, antioxidants, anti-static agents, blowing agents, mineral oil, metal deactivators, antiblocking agents, and the like, and combinations thereof. Additives may be added in amounts that do not unacceptably detract from the desired physical properties of the composition. For example, the composition may comprise about 0.1 to about 10 weight percent additives, based on the total weight of the composition.

In some embodiments, the composition further comprises a filler. The filler is preferably one that does not detract from the desirable optical properties of the composition. Thus, in some embodiments, the composition comprises a filler comprising less than 5 weight percent of particles having any dimension greater than 200 nanometers. The filler may be substantially free of particles having any dimension greater than 200 nanometers. Such fillers may include, for example, nanotalcs, fumed silicas, and nanoclays.

In some embodiments, the composition excludes polymeric component other than those specified above. For example, the composition may exclude polyesters, polyamides, polycarbonates, block copolymers other than the radial block copolymer, epoxy-substituted polymers (including epoxy-substituted poly(arylene ether)s), and water-soluble polymers (such as those described in European Patent Application No. 1,512,725 A1 (Ito)).

Composition

In some embodiments, the composition comprises:

(a) a poly(arylene ether) which is a poly(phenylene ether);

(b1) a radial block copolymer of styrene and butadiene; wherein the radial block copolymer has about 65 to about 70 weight percent of repeating units derived from styrene and a number average molecular weight of about 50,000 to about 70,000 atomic units (e.g., K-RESIN KK38) and (b2) a polystyrene-poly(ethylene-butylene)-polystyrene triblock copolymer having about 65 to about 70 weight percent of repeating units derived from styrene (e.g., TUFTEC H1043), provided that the weight percent ratio of (b1) to (b2) is 0.5:1 to 4:1;

(c) a mixture comprising benzoin (c1) and TDP (c2);

(d) a hydrocarbon resin selected from the group consisting of hydrogenated alicyclic hydrocarbon resins and hydrogenated terpene resins and having a softening point of 120 to 155° C. measured according to ASTM E28-99 (2009) (e.g., ARKON P-125, ARKON P-140, or CLEARON P-150); and optionally (e) a non-halogenated flame retardant selected from the group consisting of resorcinol bis(diphenyl phosphate) (RDP) and bisphenol A bis(diphenyl phosphate) (BPADP).

In some embodiments, (e) is RDP.

In some embodiments the weight percent ratio of (b1) to (b2) is 1.5:1 to 3:1.

In some embodiments the weight percent ratio of (b1) to (b2) is 1.75:1 to 2.25:1.

In some embodiments, the weight percent ratio of (b1) to (b2) is 1.9:1 to 2.1:1.

In some embodiments, the weight percent of (a) present in the composition is 30 to 85 percent. In some embodiments, the weight percent of (a) present in the composition is 30 to 60 percent.

In some embodiments, the weight percent of the (b1) radial block copolymer of styrene and butadiene (e.g., K-RESIN KK38) present in the composition is 10 to 30 percent and the weight percent of the (b2) polystyrene-poly(ethylene-butylene)-polystyrene triblock copolymer (e.g., TUFTEC H1043) present in the composition is 5 to 15 percent, and the ratio of weight percents of (b1) to (b2) is in the range of 2.25:1 to 1.75:1.

In some embodiments, the weight percent of benzoin (c1) present in the composition is 0.01 to 1 percent and the weight percent of TDP (c2) present in the composition is 0.01 to 0.7 percent. In other embodiments, the weight percent of benzoin present in the composition is 0.2 to 0.9 weight percent the weight percent of TDP present in the composition is 0.01 to 0.6 weight percent.

In some embodiments, the weight percent of (d) present in the composition is 1 to 20 percent. In other embodiments, the weight percent of (d) present in the composition is 2 to 12 percent.

In some embodiments, the weight percent of (e) present in the composition is 0 to 20 percent. In some embodiments, the weight percent of (e) is 6 to 14 percent.

In some embodiments, the composition comprises:

40 to 80 weight percent of (a);

12 to 36 weight percent of the (b1) radial block copolymer of styrene and butadiene (e.g., K-RESIN KK38); and 6 to 18 weight percent of the (b2) polystyrene-poly(ethylene-butylene)-polystyrene triblock copolymer (e.g., TUFTEC H1043), provided that the ratio of (b1) to (b2) is 2.25:1 to 1.75:1.

In some embodiments, the composition comprises:
  40 to 80 weight percent of (a);
  30 weight percent of the (b1) radial block copolymer of styrene and butadiene (e.g., K-RESIN KK38);
  15 weight percent of the (b2) polystyrene-poly(ethylene-butylene)-polystyrene triblock copolymer (e.g., TUFTEC H1043);
  0.2 to 0.8 weight percent benzoin (c1);
  0.1 to 0.6 weight percent of TDP (c2); and
  0 to 13 weight percent RDP (e).

In these and other embodiments, the weight percent of d present in the composition is 2 to 12 weight percent, and the composition is characterized by one or more the following properties, and preferably, two or more of the following properties, and more preferably, all three of the following properties:
  (i) a multiaxial impact of at least 20 J;
  (ii) a percent haze of 6 percent or less; and
  (iii) a percent transmittance of 80 percent or more In some embodiments, the composition comprises:
  40 to 80 weight percent of (a);
  25 weight percent of the (b1) radial block copolymer of styrene and butadiene (e.g., K-RESIN KK38);
  12.5 weight percent of the (b2) polystyrene-poly(ethylene-butylene)-polystyrene triblock copolymer (e.g., TUFTEC H1043);
  0.2 to 0.8 weight percent benzoin (c1);
  0.1 to 0.6 weight percent of TDP (c2); and
  0 to 13 weight percent RDP (e).

In these and other embodiments, the weight percent of d present in the composition is 2 to 12 weight percent, and the composition is characterized by one or more the following properties, and preferably, two or more of the following properties, and more preferably, all three of the following properties:
  (i) a multiaxial impact of at least 20 J;
  (ii) a percent haze of 6 percent or less; and
  (iii) a percent transmittance of 80 percent or more.

In some embodiments, the hydrocarbon resin is a hydrogenated alicyclic hydrocarbon resin having a softening point of 120 to 130° C. measured according to ASTM E28-99 (2009) (e.g., ARKON P-125), and the weight percent of the hydrocarbon resin present in the composition is 5 to 12 weight percent, and the composition is characterized by one or more the following properties, and preferably, two or more of the following properties, and more preferably, all three of the following properties:
  (i) a multiaxial impact of at least 30 J;
  (ii) a percent haze of 6 percent or less; and
  (iii) a percent transmittance of 80 percent or more.

In some embodiments, the hydrocarbon resin is a hydrogenated alicyclic hydrocarbon resin having a softening point of 135 to 145° C. measured according to ASTM E28-99 (2009) (e.g., ARKON P-140), and the weight percent of the hydrocarbon resin present in the composition is 3 to 8 weight percent, and the composition is characterized by one or more the following properties, and preferably, two or more of the following properties, and more preferably, all three of the following properties:
  (i) a multiaxial impact of at least 25 J;
  (ii) a percent haze of 6 percent or less; and
  (iii) a percent transmittance of 80 percent or more.

In some embodiments, the hydrocarbon resin is a hydrogenated terpene resin having a softening point of 145 to 155° C. measured according to ASTM E28-99 (2009) (e.g., CLEARON P-150), and the weight percent of the hydrocarbon resin present in the composition is 2 to 8 weight percent, and the composition is characterized by one or more the following properties, and preferably, two or more of the following properties, and more preferably, all three of the following properties:
  (i) a multiaxial impact of at least 25 J;
  (ii) a percent haze of 6 percent or less; and
  (iii) a percent transmittance of 80 percent or more.

In some embodiments, the composition comprises:
  30 to 60 weight percent of (a);
  20 to 36 weight percent of (b1);
  10 to 18 weight percent of (b2); provided that the ratio of weight percents of (b1) to (b2) is in the range of 2.25:1 to 1.75:1;
  0.1 to 1 weight percent of (c1);
  0.1 to 0.7 weight percent of (c2);
  4 to 15 weight percent of (d); and
  0 to 15 weight percent of (e).

In these and other embodiments, the weight percent of benzoin (c1) present in the composition can be 0.2 to 0.9 weight percent and the weight percent of TDP (c2) present in the composition can be 0.1 to 0.6 weight percent.

In some embodiments, the composition comprises:
  41.0 to 48.7 weight percent of (a);
  24 to 26 weight percent of (b1);
  12 to 13 weight percent of (b2), provided that the ratio of (b1) to (b2) is 2.25:1 to 1.75:1;
  0.2 to 0.4 weight percent of (c1);
  0.1 to 0.6 weight percent of (c2);
  4 to 6 weight percent of (d); and
  11 to 13 weight percent RDP (e);
based on a composition comprising 100 percent by weight of (a), (b1), (b2), (c1), (c2), (d), and (e); and wherein the composition is characterized by one or more the following properties, and preferably, two or more of the following properties, and more preferably, all three of the following properties:
  (i) a multiaxial impact of at least 20 J as measured by ASTM D 3763-08;
  (ii) a percent haze of 12 percent or less as measured by ASTM D 1003-00; and
  (iii) a percent transmittance of 80 percent or more as measured by ASTM D 1003-00.

In some embodiments, the composition comprises:
  35-55 weight percent of (a);
  12 to 36 weight percent of the (b1) radial block copolymer of styrene and butadiene (e.g., K-RESIN KK38);
  6 to 18 weight percent of the (b2) polystyrene-poly(ethylene-butylene)-polystyrene triblock copolymer (e.g., TUFTEC H1043), provided that the ratio of (b1) to (b2) is 2.25:1 to 1.75:1;
  0.2 to 0.8 weight percent benzoin;
  0.1 to 0.6 weight percent of TDP (c2); and
  2 to 12 weight percent of the hydrocarbon resin is a hydrogenated alicyclic hydrocarbon resin having a softening point of 120 to 130° C. measured according to ASTM E28-99 (2009) (e.g., ARKON P-125); and
  0 to 13 weight percent RDP;
wherein the composition is characterized by one or more the following properties, and preferably, two or more of the following properties, and more preferably, all three of the following properties:
  (i) a multiaxial impact of at least 20 J as measured by ASTM D 3763-08;
  (ii) a percent haze of 12 percent or less as measured by ASTM D 1003-00; and
  (iii) a percent transmittance of 80 percent or more as measured by ASTM D 1003-00.

In some embodiments, the composition comprises:
    35-55 weight percent of (a);
    12 to 36 weight percent of the (b1) radial block copolymer of styrene and butadiene (e.g., K-RESIN KK38);
    6 to 18 weight percent of the (b2) polystyrene-poly(ethylene-butylene)-polystyrene triblock copolymer (e.g., TUFTEC H1043), provided that the ratio of (b1) to (b2) is 2.25:1 to 1.75:1;
    0.4 to 0.8 weight percent benzoin;
    0.1 to 0.6 weight percent of TDP (c2); and
    2 to 12 weight percent of the hydrocarbon resin is a hydrogenated alicyclic hydrocarbon resin having a softening point of 135 to 145° C. measured according to ASTM E28-99 (2009) (e.g., ARKON P-140); and
    0 to 13 weight percent RDP;
wherein the composition is characterized by one or more the following properties, and preferably, two or more of the following properties, and more preferably, all three of the following properties:
    (i) a multiaxial impact of at least 20 J as measured by ASTM D 3763-08;
    (ii) a percent haze of 12 percent or less as measured by ASTM D 1003-00; and
    (iii) a percent transmittance of 80 percent or more as measured by ASTM D 1003-00.

In some embodiments, the composition comprises:
    40 to 50 weight percent of (a);
    12 to 36 weight percent of the (b1) radial block copolymer of styrene and butadiene (e.g., K-RESIN KK38);
    6 to 18 weight percent of the (b2) polystyrene-poly(ethylene-butylene)-polystyrene triblock copolymer (e.g., TUFTEC H1043), provided that the ratio of (b1) to (b2) is 2.25:1 to 1.75:1;
    0.2 to 0.8 weight percent benzoin (c1);
    0.1 to 0.6 weight percent of TDP (c2); and
    2 to 12 weight percent of the hydrocarbon resin, wherein the hydrocarbon resin is a hydrogenated terpene resin having a softening point of 145 to 155° C. measured according to ASTM E28-99 (2009) (e.g., CLEARON P-150); and
    0 to 13 weight percent RDP;
wherein the composition is characterized by one or more the following properties, and preferably, two or more of the following properties, and more preferably, all three of the following properties:
    (i) a multiaxial impact of at least 20 J as measured by ASTM D 3763-08;
    (ii) a percent haze of 6 percent or less as measured by ASTM D 1003-00; and
    (iii) a percent transmittance of 80 percent or more as measured by ASTM D 1003-00.

In some embodiments, the composition comprises:
    30 to 60 weight percent of (a);
    12 to 36 weight percent of (b1);
    6 to 18 weight percent of (b2) wherein the weight percent ratio of (b1) to (b2) is between 2.25:1 to 1.75:1;
    0.1 to 1 weight percent of (c); and
    2 to 15 weight percent of (d) a hydrocarbon resin selected from the group consisting of hydrogenated alicyclic hydrocarbon resins and hydrogenated terpene resins, and having a softening point of 120 to 155° C. measured according to ASTM E28-99 (2009) (e.g., ARKON P-125, ARKON P-140, or CLEARON P-150).

In this and other embodiments (c) can comprise (c1) and (c2), wherein (c1) is an alpha-hydroxyketone selected from the group consisting of hydroxyacetone (1-hydroxy-2-propanone; Chemical Abstracts Service (CAS) Reg. No. 116-09-6), acetoin (3-hydroxy-2-butanone; CAS Reg. No. 513-86-0), 2-hydroxyacetophenone (CAS Reg. No. 528-24-1), benzoin (2-hydroxy-2-phenylacetophenone CAS Reg. No. 119-53-9), 2-hydroxy-1-phenyl-2-p-tolyl-ethanone (CAS Reg. No. 2431-02-9); and (c2) is a trihydrocarbyl phosphites $P(OR^{11})_3$, wherein each occurrence of $R^{11}$ is independently $C_1$-$C_{18}$ hydrocarbyl, wherein (c2) is selected from the group consisting of trioctyl phosphite, tridecyl phosphite, tridodecyl phosphite, phenyl didecyl phosphite, decyl diphenyl phosphite, triphenyl phosphite, and tritolyl phosphite. More particularly, (c1) is benzoin and (c2) is selected from the group consisting of trioctyl phosphite, tridecyl phosphite (TDP), tridodecyl phosphite, phenyl didecyl phosphite, decyl diphenyl phosphite, triphenyl phosphite, and tritolyl phosphite. The composition in this and other embodiments comprises 0.2 to 0.9 weight percent of benzoin (c1) and 0.01 to 0.6 weight percent of (c2) wherein (c2) is TDP.

In this and other embodiments, the composition further comprises from 0 to 15 weight percent of (e) a flame retardant, wherein (e) is a halogenated flame retardant or a phosphorous-containing flame retardant. More particularly, (e) is resorcinol bis(diphenyl phosphate) (RDP) or bisphenol A bis(diphenyl phosphate) (BPADP).

In some embodiments, the composition comprises:
    (b1) is a radial block copolymer of styrene and butadiene; wherein the radial block copolymer has about 65 to about 70 weight percent of repeating units derived from styrene and a number average molecular weight of about 50,000 to about 70,000 atomic units (e.g., K-RESIN KK38);
    (b2) is a polystyrene-poly(ethylene-butylene)-polystyrene triblock copolymer having about 65 to about 70 weight percent of repeating units derived from styrene (e.g., TUFTEC H1043); and
    (c) is benzoin, and further comprising 0.01 to 0.6 weight percent of TDP and 0 to 15 weight percent of RDP.

In some embodiments, the composition comprises:
    30 to 60 weight percent of (a);
    20 to 36 weight percent of (b1);
    10 to 18 weight percent of (b2) wherein the ratio of weight percents of (b1) to (b2) is 1.75:1 to 2.25:1;
    0.1 to 1 weight percent of (c);
    2 to 15 weight percent of (d) wherein (d) is a hydrocarbon resin selected from the group consisting of hydrogenated alicyclic hydrocarbon resins and hydrogenated terpene resins, and having a softening point of 135 to 155° C. measured according to ASTM E28-99 (2009) (e.g., ARKON P-140 or CLEARON P-150) or 4 to 15 weight percent of (d) wherein (d) is a hydrogenated alicyclic hydrocarbon resin having a softening point of 120 to 130° C. measured according to ASTM E28-99 (2009) (e.g., ARKON P-125); and optionally further comprising from 0 to 15 weight percent of (e) a flame retardant;
wherein the composition has a multiaxial impact of at least 20 J as measured by ASTM D 3763-08 and is characterized by one or more of the following properties:
    (i) a percent haze of 15 percent or less as measured by ASTM D 1003-00; and
    (ii) a percent transmittance of 75 percent or more as measured by ASTM D 1003-00.

In some embodiments of the composition:
    (b1) is a radial block copolymer of styrene and butadiene; wherein the radial block copolymer has about 65 to about 70 weight percent of repeating units derived from styrene and a number average molecular weight of about 50,000 to about 70,000 atomic units (e.g., K-RESIN KK38);

(b2) is a polystyrene-poly(ethylene-butylene)-polystyrene triblock copolymer having about 65 to about 70 weight percent of repeating units derived from styrene (e.g., TUFTEC H1043);

(c) is benzoin; and optionally further comprising from 0.1 to 0.6 weight percent of TDP.

In some embodiments, the composition comprises:

41.0 to 48.7 weight percent of a poly(phenylene ether);

24 to 26 weight percent of a radial block copolymer of styrene and butadiene; wherein the radial block copolymer has about 65 to about 70 weight percent of repeating units derived from styrene and a number average molecular weight of about 50,000 to about 70,000 atomic units (e.g., K-RESIN KK38);

12 to 13 percent of a polystyrene-poly(ethylene-butylene)-polystyrene triblock copolymer having about 65 to about 70 weight percent of repeating units derived from styrene (e.g., TUFTEC H1043), provided that the ratio of the radial block copolymer to the polystyrene-poly(ethylene-butylene)-polystyrene triblock copolymer is 2.25:1 to 1.75:1;

0.2 to 0.4 weight percent of benzoin;

0.1 to 0.6 weight percent of TDP;

2 to 15 weight percent of a hydrocarbon resin selected from the group consisting of hydrogenated alicyclic hydrocarbon resins and hydrogenated terpene resins, and having a softening point of 135 to 155° C. measured according to ASTM E28-99 (2009) (e.g., ARKON P-140 or CLEARON P-150), or 4 to 15 weight percent of a hydrogenated alicyclic hydrocarbon resin having a softening point of 120 to 130° C. measured according to ASTM E28-99 (2009) (e.g., ARKON P-125); and 11 to 13 weight percent RDP;

based on a composition comprising 100 percent by weight, and wherein the composition has a multiaxial impact of at least 20 J as measured by ASTM D 3763-08 and is characterized by one or more of the following properties:

(i) a percent haze of 15 percent or less as measured by ASTM D 1003-00; and (ii) a percent transmittance of 75 percent or more as measured by ASTM D 1003-00.

In this and other embodiments, the ratio of weight percent ratios of KK38 to Tuftec 1043 is between 1.9:1 to 2.1:1.

Process

In another aspect, the invention provides a process for preparing a thermoplastic composition comprising combining components (a), (b2), (c), (d), and optionally (e) as described herein at the feed throat ("upstream") of an extruder. Component (b1) is added "downstream" of the extruder feed throat, to minimize haze and reduce rubber degradation. For instance, the process comprises combining components (a), (b2), (c), (d), and optionally (e) as described herein at the feed throat ("upstream") and (b1) at the sixth barrel ("downstream") of a Werner Pfleiderer twin screw 30 mm extruder at a temperature of 220° C. to 280° C., a screw rate of 350 rpm, and a feed rate of 40 pounds per hour. The skilled artisan will recognize that other extruders may also be used to practice the invention.

The resulting thermoplastic is characterized by at least one of the following properties:

(i) a multiaxial impact of at least 20 J as measured by ASTM D 3763-08;

(ii) a percent haze of 15 percent or less as measured by ASTM D 1003-00; and (iii) a percent transmittance of 75 percent or more as measured by ASTM D 1003-00.

Thus, in one aspect, the invention is directed to a process for preparing a composition comprising:

(a) a poly(arylene ether);

(b1) a radial block copolymer of an alkenyl aromatic monomer and a conjugated diene; wherein the radial block copolymer has about 50 to about 70 weight percent of repeating units derived from the alkenyl aromatic monomer and a number average molecular weight of about 50,000 to about 70,000 atomic units;

(b2) a linear block copolymer of an alkenyl aromatic monomer and a conjugated diene; wherein the linear block copolymer has about 55 to about 70 weight percent of repeating units derived from the alkenyl aromatic monomer; wherein the ratio of (b1) to (b2) is 0.5:1 to 4:1;

(c) one or more optical enhancing agents; and (d) a hydrocarbon resin selected from the group consisting of hydrogenated alicyclic hydrocarbon resins and hydrogenated terpene resins;

wherein the composition is characterized by one or more of the following properties:

(i) a multiaxial impact of at least 20 J as measured by ASTM D 3763-08;

(ii) a percent haze of 15 percent or less as measured by ASTM D 1003-00; and (iii) a percent transmittance of 75 percent or more as measured by ASTM D 1003-00 comprising the steps of:

(1) combining (a), (c), (b2), and (d) in the feed throat of an extruder to form a first mixture;

(2) extruding the first mixture at a temperature of 220° C. to 280° C., a screw rate of 350 rpm, and a feed rate of 40 pounds per hour; and (3) adding (b1) to the extruding mixture as it progresses from the extruder feed throat toward the die to form a second mixture.

In one embodiment, the mixture of step (1) further comprises (e) a flame retardant selected from the group consisting of resorcinol bis(diphenyl phosphate) (RDP) and bisphenol A bis(diphenyl phosphate) (BPADP) to the first mixture during step (2).

In another embodiment, the first mixture comprises (a) a poly(arylene ether) comprising a poly(phenylene ether);

(b2) a polystyrene-poly(ethylene-butylene)-polystyrene triblock copolymer having about 65 to about 70 weight percent of repeating units derived from styrene (e.g., TUFTEC H1043);

(c) benzoin (c1) and tridecyl phosphite (c2, TDP); and (d) a hydrocarbon resin selected from the group consisting of hydrogenated alicyclic hydrocarbon resins and hydrogenated terpene resins and having a softening point of 120 to 155° C. measured according to ASTM E28-99 (2009) (e.g., ARKON P-125, ARKON P-140, or CLEARON P-150);

In another embodiment, the second mixture comprises:

(a) a poly(arylene ether) comprising a poly(phenylene ether);

(b1) a radial block copolymer of styrene and butadiene; wherein the radial block copolymer has about 65 to about 70 weight percent of repeating units derived from styrene and a number average molecular weight of about 50,000 to about 70,000 atomic units (e.g., K-RESIN KK38);

(b2) a polystyrene-poly(ethylene-butylene)-polystyrene triblock copolymer having about 65 to about 70 weight percent of repeating units derived from styrene (e.g., TUFTEC H1043);

(c) benzoin (c1) and tridecyl phosphite (c2, TDP);

(d) a hydrocarbon resin selected from the group consisting of hydrogenated alicyclic hydrocarbon resins and hydrogenated terpene resins and having a softening point of 120 to 155° C. measured according to ASTM E28-99 (2009) (e.g., ARKON P-125, ARKON P-140, or CLEARON P-150); and (e) a non-halogenated flame retardant selected from the group consisting of resorcinol bis(diphenyl phosphate) (RDP) and bisphenol A bis(diphenyl phosphate) (BPADP).

In another embodiment, the second mixture comprises:
35 to 85 weight percent of (a);
10 to 40 weight percent of (b1) a radial block copolymer of styrene and butadiene; wherein the radial block copolymer has about 65 to about 70 weight percent of repeating units derived from styrene and a number average molecular weight of about 50,000 to about 70,000 atomic units (e.g., K-RESIN KK38);
5 to 20 weight percent of (b2) a polystyrene-poly(ethylene-butylene)-polystyrene triblock copolymer having about 65 to about 70 weight percent of repeating units derived from styrene (e.g., TUFTEC H1043);
0 to 1 weight percent (c1) benzoin;
0 to 0.7 weight percent of (c2) TDP;
0 to 20 weight percent of (d); and
0 to 20 weight percent of (e).

In another embodiment, the second mixture comprises 6 to 14 weight percent of (e).

In another embodiment, the second mixture comprises:
40 to 80 weight percent of (a);
12 to 35 weight percent of (b1) a radial block copolymer of styrene and butadiene; wherein the radial block copolymer has about 65 to about 70 weight percent of repeating units derived from styrene and a number average molecular weight of about 50,000 to about 70,000 atomic units (e.g., K-RESIN KK38); and
3 to 18 weight percent of (b2) a polystyrene-poly(ethylene-butylene)-polystyrene triblock copolymer having about 65 to about 70 weight percent of repeating units derived from styrene (e.g., TUFTEC H1043).

In another embodiment, the second mixture comprises:
25 weight percent of (b1) a radial block copolymer of styrene and butadiene; wherein the radial block copolymer has about 65 to about 70 weight percent of repeating units derived from styrene and a number average molecular weight of about 50,000 to about 70,000 atomic units (e.g., K-RESIN KK38); and
12.5 weight percent of (b2) a polystyrene-poly(ethylene-butylene)-polystyrene triblock copolymer having about 65 to about 70 weight percent of repeating units derived from styrene (e.g., TUFTEC H1043).

In another embodiment, the second mixture comprises:
5 to 8 weight percent of (d1) a hydrogenated alicyclic hydrocarbon resin having a softening point of 120 to 130° C. measured according to ASTM E28-99 (2009) (e.g., ARKON P-125) and the resulting extrudate of step (3) is characterized by one or more of the following properties:
(i) a multiaxial impact of at least 20 J;
(ii) a percent haze of 6 percent or less; and
(iii) a percent transmittance of 80 percent or more.

In another embodiment, the second mixture comprises:
3 to 8 weight percent of (d) a hydrogenated alicyclic hydrocarbon resin having a softening point of 135 to 145° C. measured according to ASTM E28-99 (2009) (e.g., ARKON P-140), and the resulting extrudate of step (3) is characterized by one or more of the following properties:
(i) a multiaxial impact of at least 25 J;
(ii) a percent haze of 6 percent or less; and
(iii) a percent transmittance of 80 percent or more.

In another embodiment, the second mixture comprises:
2 to 8 weight percent of (d) a hydrogenated terpene resin having a softening point of 145 to 155° C. measured according to ASTM E28-99 (2009) (e.g., CLEARON P-150), and the resulting extrudate of step (3) is characterized by one or more of the following properties:
(i) a multiaxial impact of at least 25 J;
(ii) a percent haze of 6 percent or less; and
(iii) a percent transmittance of 80 percent or more.

In another embodiment, the second mixture comprises:
30 to 60 weight percent of (a);
20 to 36 weight percent of (b1);
10 to 18 weight percent of (b2); provided that the ratio of weight percents of (b1) to (b2) is in the range of 1.75:1 to 2.25:1;
0.1 to 1 weight percent of (c1);
0.1 to 0.7 weight percent of (c2);
4 to 15 weight percent of (d); and
0 to 15 weight percent of (e).

In these and other embodiments, the weight percent of benzoin (c1) present in the composition is 0.2 to 0.9 weight percent and the weight percent of TDP (c2) present in the composition is 0.01 to 0.6 weight percent.

In another embodiment, the second mixture comprises:
41.0 to 48.7 weight percent of (a);
24-26 weight percent of (b1);
12 to 13 weight percent of (b2), provided that the ratio of (b1) to (b2) is 2.25:1 to 1.75:1;
0.2 to 0.4 weight percent of (c1);
0.1 to 0.6 weight percent of (c2);
4 to 6 weight percent of (d); and
11 to 13 weight percent RDP;
based on a composition comprising 100 percent by weight of (a), (b1), (b2), (c1), (c2), (d), and (e), and wherein the composition is characterized by at least two of the following properties:
(i) a multiaxial impact of at least 20 J as measured by ASTM D 3763-08;
(ii) a percent haze of 12 percent or less as measured by ASTM D 1003-00; and
(iii) a percent transmittance of 80 percent or more as measured by ASTM D 1003-00.

Other aspects include articles formed from any of the above-described compositions. The compositions are useful for products including, for example, animal cages, food packaging, sheet, film, ink cartridges, trays, tubes, and pipes.

The invention includes the following embodiments.

Embodiment 1

A composition comprising: (a) a poly(arylene ether); (b1) a radial block copolymer of an alkenyl aromatic monomer and a conjugated diene; wherein the radial block copolymer has about 50 to about 70 weight percent of repeating units derived from the alkenyl aromatic monomer and a number average molecular weight of about 50,000 to about 70,000 atomic units; (b2) a linear block copolymer of an alkenyl aromatic monomer and a conjugated diene; wherein the linear block copolymer has about 55 to about 70 weight percent of repeating units derived from the alkenyl aromatic monomer; wherein the ratio of (b1) to (b2) is 0.5:1 to 4:1; (c) one or more optical enhancing agents; and (d) a hydrocarbon resin selected from the group consisting of hydrogenated alicyclic hydrocarbon resins and hydrogenated terpene resins; wherein the composition is characterized by one or more of the following properties: (i) a multiaxial impact of at least 20 J as measured by ASTM D 3763-08; (ii) a percent haze of 15 percent or less as measured by ASTM D 1003-00; and (iii) a percent transmittance of 75 percent or more as measured by ASTM D 1003-00.

Embodiment 2

The composition of embodiment 1, wherein the poly (arylene ether) comprises 2,6-dimethyl-1,4-phenylene ether units, 2,3,6-trimethyl-1,4-phenylene ether units, or a combination thereof.

Embodiment 3

The composition of embodiment 1 or 2, further comprising (e) a flame retardant.

Embodiment 4

The composition of embodiment 3, wherein (e) is a halogenated flame retardant or a phosphorous-containing flame retardant.

Embodiment 5

The composition of embodiment 4, wherein (e) is a phosphorous-containing flame retardant selected from the group consisting of resorcinol bis(diphenyl phosphate) (RDP) and bisphenol A bis(diphenyl phosphate) (BPADP).

Embodiment 6

The composition of any of embodiments 1-5, wherein the ratio of (b1) to (b2) is 1:1 to 3:1.

Embodiment 7

The composition of any of embodiments 1-6, wherein (c) comprises (c1) and (c2), wherein: (c1) is an alpha-hydroxyketone selected from the group consisting of hydroxyacetone (1-hydroxy-2-propanone; Chemical Abstracts Service (CAS) Reg. No. 116-09-6), acetoin (3-hydroxy-2-butanone; CAS Reg. No. 513-86-0), 2-hydroxyacetophenone (CAS Reg. No. 528-24-1), benzoin (2-hydroxy-2-phenylacetophenone CAS Reg. No. 119-53-9), 2-hydroxy-1-phenyl-2-p-tolyl-ethanone (CAS Reg. No. 2431-02-9); and (c2) is a trihydrocarbyl phosphites $P(OR^{11})_3$, wherein each occurrence of $R^{11}$ is independently $C_1$-$C_{18}$ hydrocarbyl, wherein (c2) is selected from the group consisting of trioctyl phosphite, tridecyl phosphite, tridodecyl phosphite, phenyl didecyl phosphite, decyl diphenyl phosphite, triphenyl phosphite, and tritolyl phosphite.

Embodiment 8

The composition of embodiment 7, wherein (c1) is benzoin and (c2) is selected from the group consisting of trioctyl phosphite, tridecyl phosphite (TDP), tridodecyl phosphite, phenyl didecyl phosphite, decyl diphenyl phosphite, triphenyl phosphite, and tritolyl phosphite.

Embodiment 9

The composition of any of embodiments 1-8, wherein the hydrocarbon resin (d) has a softening point of 120 to 155° C. measured according to ASTM E28-99 (2009).

Embodiment 10

The composition of any of embodiments 1-9, further comprising one or more additives selected from the group consisting of stabilizers, mold release agents, processing aids, drip retardants, nucleating agents, UV blockers, dyes, pigments, antioxidants, anti-static agents, blowing agents, mineral oil, metal deactivators, antiblocking agents, and the like, and combinations thereof.

Embodiment 11

The composition of any of embodiments 1-10, further comprising a filler selected from the group consisting of nanotalcs, fumed silicas, and nanoclays.

Embodiment 12

The composition of embodiment 1, wherein: (a) the poly (arylene ether) comprises a poly(phenylene ether); (b1) has about 65 to about 70 weight percent of repeating units derived from the alkenyl aromatic monomer; wherein the alkenyl aromatic monomer is styrene and the conjugated diene is butadiene; (b2) has about 65 to about 70 weight percent of repeating units derived from the alkenyl aromatic monomer; wherein the linear block copolymer is a polystyrene-poly (ethylene-butylene)-polystyrene triblock copolymer; and wherein the ratio of (b1) to (b2) is from 1.5:1 to 2.5:1; (c) comprises benzoin (c1) and tridecyl phosphite (c2, TDP); and (d) has a softening point of about 120 to about 155° C. measured according to ASTM E28-99 (2009); further comprising a non-halogenated flame retardant (e) selected from the group consisting of resorcinol bis(diphenyl phosphate) (RDP) and bisphenol A bis(diphenyl phosphate) (BPADP).

Embodiment 13

The composition of embodiment 12, wherein (e) is RDP.

Embodiment 14

The composition of embodiment 12, wherein the weight percent ratio of (b1) to (b2) is 1.75:1 to 2.25:1.

Embodiment 15

The composition of embodiment 12, wherein the weight percent ratio of (b1) to (b2) is 1.9:1 to 2.1:1.

Embodiment 16

The composition of embodiment 1 or 2, comprising: 30 to 60 weight percent of (a); 12 to 36 weight percent of (b1); 6 to 18 weight percent of (b2) wherein the weight percent ratio of (b1) to (b2) is 1.75:1 to 2.25:1; 0.1 to 1 weight percent of (c); and 2 to 15 weight percent of (d).

Embodiment 17

The composition of embodiment 16, wherein (d) has a softening point of 120 to 155° C. measured according to ASTM E28-99 (2009).

Embodiment 18

The composition of embodiment 16, wherein (c) comprises (c1) and (c2), wherein: (c1) is an alpha-hydroxyketone selected from the group consisting of hydroxyacetone (1-hydroxy-2-propanone; Chemical Abstracts Service (CAS) Reg. No. 116-09-6), acetoin (3-hydroxy-2-butanone; CAS Reg. No. 513-86-0), 2-hydroxyacetophenone (CAS Reg. No. 528-

24-1), benzoin (2-hydroxy-2-phenylacetophenone CAS Reg. No. 119-53-9), 2-hydroxy-1-phenyl-2-p-tolyl-ethanone (CAS Reg. No. 2431-02-9); and (c2) is a trihydrocarbyl phosphites P(OR$^{11}$)$_3$, wherein each occurrence of R$^{11}$ is independently C$_1$-C$_{18}$ hydrocarbyl, wherein (c2) is selected from the group consisting of trioctyl phosphite, tridecyl phosphite, tridodecyl phosphite, phenyl didecyl phosphite, decyl diphenyl phosphite, triphenyl phosphite, and tritolyl phosphite.

Embodiment 19

The composition of embodiment 18, wherein (c1) is benzoin and (c2) is selected from the group consisting of trioctyl phosphite, tridecyl phosphite (TDP), tridodecyl phosphite, phenyl didecyl phosphite, decyl diphenyl phosphite, triphenyl phosphite, and tritolyl phosphite.

Embodiment 20

The composition of embodiment 19, comprising 0.2 to 0.9 weight percent of benzoin (c1) and 0.01 to 0.6 weight percent of (c2) wherein (c2) is TDP.

Embodiment 21

The composition of embodiment 16, further comprising (e) a flame retardant.

Embodiment 22

The composition of embodiment 21, wherein (e) is a halogenated flame retardant or a phosphorous-containing flame retardant.

Embodiment 23

The composition of embodiment 22, wherein (e) is resorcinol bis(diphenyl phosphate) (RDP) or bisphenol A bis(diphenyl phosphate) (BPADP).

Embodiment 24

The composition of embodiment 16 or 17, wherein: (b1) has about 65 to about 70 weight percent of repeating units derived from the alkenyl aromatic monomer; wherein the alkenyl aromatic monomer is styrene and the conjugated diene is butadiene; (b2) has about 65 to about 70 weight percent of repeating units derived from the alkenyl aromatic monomer; wherein the linear block copolymer is a polystyrene-poly(ethylene-butylene)-polystyrene triblock copolymer; and (c) is benzoin; further comprising 0.01 to 0.6 weight percent of TDP and 0 to 15 weight percent of RDP.

Embodiment 25

The composition of embodiment 1 or 2, comprising: 30 to 60 weight percent of (a); 20 to 36 weight percent of (b1); 10 to 18 weight percent of (b2) wherein the ratio of weight percents of (b1) to (b2) is between 2.25:1 to 1.75:1; 0.1 to 1 weight percent of (c); and 2 to 15 weight percent of (d) wherein (d) has a softening point of about 135 to about 155° C. measured according to ASTM E28-99 (2009), or 4 to 15 weight percent of (d) wherein (d) has a softening point of about 120 to about 130° C. measured according to ASTM E28-99 (2009); wherein the composition has a multiaxial impact of at least 20 J as measured by ASTM D 3763-08 and is characterized by one or more of the following properties: (i) a percent haze of 15 percent or less as measured by ASTM D 1003-00; and (ii) a percent transmittance of 75 percent or more as measured by ASTM D 1003-00.

Embodiment 26

The composition of embodiment 25, further comprising (e) a flame retardant.

Embodiment 27

The composition of embodiment 25 or 26, wherein: (b1) has about 65 to about 70 weight percent of repeating units derived from the alkenyl aromatic monomer; wherein the alkenyl aromatic monomer is styrene and the conjugated diene is butadiene; (b2) has about 65 to about 70 weight percent of repeating units derived from the alkenyl aromatic monomer; wherein the linear block copolymer is a polystyrene-poly(ethylene-butylene)-polystyrene triblock copolymer; and (c) is benzoin.

Embodiment 28

The composition of embodiment 27, further comprising from 0.1 to 0.6 weight percent of TDP.

Embodiment 29

The composition of embodiment 7, comprising 41.0 to 48.7 weight percent of (a); 24 to 26 weight percent of (b1); 12 to 13 weight percent of (b2), provided that the ratio of (b1) to (b2) is 1.75:1 to 2.25:1; 0.2 to 0.4 weight percent of (c1); 0.1 to 0.6 weight percent of (c2); 2 to 15 weight percent of (d) wherein (d) has a softening point of about 135 to about 155° C. measured according to ASTM E28-99 (2009), or 4 to 15 weight percent of (d) wherein (d) has a softening point of about 120 to about 130° C. measured according to ASTM E28-99 (2009); and further comprising 11 to 13 weight percent RDP; based on a composition comprising 100 percent by weight of (a), (b1), (b2), (c1), (c2), (d), and (e), and wherein the composition has a multiaxial impact of at least 20 J as measured by ASTM D 3763-08 and is characterized by one or more of the following properties: (i) a percent haze of 15 percent or less as measured by ASTM D 1003-00; and (ii) a percent transmittance of 75 percent or more as measured by ASTM D 1003-00.

Embodiment 30

The composition of embodiment 29, wherein the ratio of (b1) to (b2) is 1.9:1 to 2.1:1.

Embodiment 31

The composition of embodiment 30, wherein: (b1) has about 65 to about 70 weight percent of repeating units derived from the alkenyl aromatic monomer; wherein the alkenyl aromatic monomer is styrene and the conjugated diene is butadiene; (b2) has about 65 to about 70 weight percent of repeating units derived from the alkenyl aromatic monomer; wherein the linear block copolymer is a polystyrene-poly(ethylene-butylene)-polystyrene triblock copolymer; (c1) is benzoin; and (c2) is TDP.

Embodiment 32

A composition, comprising: 41.0 to 48.7 weight percent of a poly(phenylene ether); 24 to 26 weight percent of a radial block copolymer of styrene and butadiene; wherein the radial block copolymer has about 65 to about 70 weight percent of repeating units derived from styrene and a number average molecular weight of about 50,000 to about 70,000 atomic units; 12 to 13 percent of a linear block copolymer of an alkenyl aromatic monomer and a conjugated diene; wherein the linear block copolymer has about 65 to about 70 weight percent of repeating units derived from the alkenyl aromatic monomer; wherein the linear block copolymer is a polystyrene-poly(ethylene-butylene)-polystyrene triblock copolymer; provided that the ratio of the radial block copolymer to the linear block copolymer is 2.25:1 to 1.75:1; 0.2 to 0.4 weight percent of benzoin; 0.1 to 0.6 weight percent of TDP; a hydrocarbon resin selected from the group consisting of hydrogenated alicyclic hydrocarbon resins and hydrogenated terpene resins, in an amount of 2 to 15 weight percent wherein the hydrocarbon resin has a softening point of about 135 to about 155° C. measured according to ASTM E28-99 (2009), or in an amount of 4 to 15 weight percent of wherein the hydrocarbon resin has a softening point of about 120 to about 130° C. measured according to ASTM E28-99 (2009); and 11 to 13 weight percent RDP; based on a composition comprising 100 percent by weight, and wherein the composition has a multiaxial impact of at least 20 J as measured by ASTM D 3763-08 and is characterized by one or more of the following properties: (i) a percent haze of 15 percent or less as measured by ASTM D 1003-00; and (ii) a percent transmittance of 75 percent or more as measured by ASTM D 1003-00.

Embodiment 33

The composition of embodiment 32, wherein the ratio the radial block copolymer to the linear block copolymer is 1.9:1 to 2.1:1.

Embodiment 34

A process for preparing the composition of embodiment 1, comprising: (1) combining (a), (c), (b2), and (d) in the feed throat of an extruder to form a first mixture; (2) extruding (i.e., compounding) the first mixture at a temperature of 220 to 280° C.; and (3) adding (b1) to the extruding mixture as it progresses from the extruder feed throat toward the die to form a second mixture.

Embodiment 35

The process of embodiment 34, wherein the first mixture further comprises (e) a flame retardant selected from the group consisting of resorcinol bis(diphenyl phosphate) (RDP) and bisphenol A bis(diphenyl phosphate) (BPADP) to the first mixture during step (2).

Embodiment 36

The process of embodiment 34, wherein the first mixture comprises: (a) a poly(arylene ether) comprising a poly(phenylene ether); (b2) a polystyrene-poly(ethylene-butylene)-polystyrene triblock copolymer having about 65 to about 70 weight percent of repeating units derived from styrene; (c) benzoin (c1) and TDP (c2); and (d) a hydrocarbon resin having a softening point of about 120 to about 155° C. measured according to ASTM E28-99 (2009).

Embodiment 37

The process of embodiments 34, wherein the second mixture comprises: (a) a poly(arylene ether) comprising a poly(phenylene ether); (b1) a radial block copolymer of styrene and butadiene; wherein the radial block copolymer has about 65 to about 70 weight percent of repeating units derived from styrene; (b2) a polystyrene-poly(ethylene-butylene)-polystyrene triblock copolymer having about 65 to about 70 weight percent of repeating units derived from styrene; (c) benzoin (c1) and tridecyl phosphite (c2, TDP); (d) a hydrocarbon resin having a softening point of about 120 to about 155° C. measured according to ASTM E28-99 (2009); and (e) a non-halogenated flame retardant selected from the group consisting of resorcinol bis(diphenyl phosphate) (RDP) and bisphenol A bis(diphenyl phosphate) (BPADP).

Embodiment 38

The process of embodiment 37, wherein the second mixture comprises: 30 to 60 weight percent of (a); 20 to 36 weight percent of (b1); 10 to 18 weight percent of (b2); provided that the ratio of weight percents of (b1) to (b2) is in the range of 2.25:1 to 1.75:1; 0.1 to 1 weight percent of (c1); 0.1 to 0.7 weight percent of (c2); 4 to 15 weight percent of (d); and 0 to 15 weight percent of (e).

Embodiment 39

An article comprising the composition of any of embodiments 1-33.

Embodiment 40

The article of embodiment 39, which is a container or a protective covering.

The invention is further illustrated by the following non-limiting examples.

EXAMPLES

All samples were prepared on a 30 mm Werner Pfleiderer extruder. All blend components were added at the feed throat with the exception of KK38, which was added at the 6$^{th}$ barrel unless otherwise stated. Extrusion temperatures were set at 240° C., 250° C., 260° C., 260° C., 260° C. and 250° C. from feed throat to die. The extruder was run at 350 RPM with a 40 pound/hour feed rate and full vacuum on barrel 9.

All samples were molded on a 170 ton 8.5 oz barrel Vandorn molder. Temperatures were set at 450° F. for the barrel and 150° F. for the mold. A 4.4" shot with 0.5" cutoff and 2'/second velocity was used. The molded tree consisted of 2-4"×⅛" plaques, 2 type I tensile bars, 2 Izod bars and 2½"×5"×⅛" bars.

Table of Materials

| Component | Source |
|---|---|
| .40IV-PPE | Poly (2,6 dimethyl-1,4-phenylene ether) having an intrinsic viscosity 0.40 deciliter/gram, obtained as PPO 640 from SABIC's Innovative Plastics business |

Table of Materials

| Component | Source |
| --- | --- |
| .46IV-PPE | Poly (2,6 dimethyl-1,4-phenylene ether) having an intrinsic viscosity 0.46 deciliter/gram, obtained as PPO 646 from SABIC's Innovative Plastics business |
| KK38 | Styrene-Butadiene Radial Block Copolymer, obtained as K-RESIN KK38 from Chevron Phillips |
| Tuftec H1043 | Polystyrene-poly(ethylene-butylene)-polystyrene triblock copolymer having a polystyrene content of about 67 weight percent, obtained as TUFTEC H1043 from Asahi Kasei |
| Benzoin | 2-Hydroxy-1,2-di(phenyl)ethanone (CAS 119-5309), from Sinbiotik |
| Tridecyl Phosphite (TDP) | Phosphorous acid, trisdecyl ester (CAS2929-86-4), from Dover Corporation |
| Resorcinol bis(diphenyl phosphate) (RDP) | Tetraphenyl resorcinol diphosphate (CAS 125997-21-9), from IPL Supresta |
| ARKON P-125 | Hydrogenated alicyclic hydrocarbon resin having a softening point of about 125° C. and a glass transition temperature ($T_g$) of about 74° C., obtained as ARKON P-125 from Arakawa Chemical Company |
| ARKON P-140 | Hydrogenated alicyclic hydrocarbon resin having a softening point of about 140° C. and a glass transition temperature of about 90° C., obtained as ARKON P-140 from Arakawa Chemical Company |
| CLEARON P-150 | Hydrogenated terpene resin having a softening point of about 152° C. and a glass transition temperature ($T_g$) of about 98° C., obtained as CLEARON P-150 from Yasuhara Chemical Company |

ASTM Tests

Percent haze was measured according to American Society for testing Materials (ASTM) D1003-00 at 23° C. and a thickness of 3.2 millimeters. Percent haze is an objective property that correlates with the subject property of optical clarity.

Percent transmittance was measured according to ASTM D 1003-00 at a thickness of 3.2 millimeters (mm).

Multiaxial Impact ("Standard Test Method for High Speed Puncture Properties of Plastics Using Load and Displacement Sensors") was measured in Joules (J) according to ASTM D 3763-08 at a test velocity of 3.3 meters/second (m/s) at 23° C. and a thickness of 3.2 mm.

HDT ("Standard Test Method for Deflection Temperature of Plastics under Flexural Load in the Edgewise Position") was measured according to ASTM D 648-07 on 3.2 mm×12.5 mm bars at a loading fiber stress of 1.82+/−2.5% Mega Pascal (MPa).

Examples 1-12

In general, in samples containing 15 percent KK-38 and 7.5 percent Tuftec H1043, the addition of Benzoin and Arkon P125 reduced the observed multiaxial impact. In Examples 1-12, 15 weight percent of KK-38 and 7.5 weight percent of Tuftec H1043 were used to make the resins. The ratio of KK-38 to Tuftec H1043 was maintained at 2 to 1 in each of the examples, but the amount of the other ingredients that were used was varied. The results are summarized in Tables 1A, 1B, and 1C.

Examples 1-4 (Table 1A) illustrate how the presence of benzoin and Arkon P-125 affect the properties of the resin. Thus, the resin of Example 1 ("Control") was free of benzoin and Arkon P-125. When 0.3 weight percent of benzoin was added to the resin composition (Example 2), haze and percent transmittance improved compared to Example 1, but multiaxial impact resistance did not. This finding was also observed in Example 3, where the resin contained both benzoin (0.3 weight percent) and Arkon P-125 (5 weight percent). Increasing the amount of Arkon P-125 to 10 weight percent improved haze and percent transmittance relative to Examples 2 and 3, but multiaxial impact resistance was reduced relative to the Examples 1-3.

TABLE 1A

Effect of Benzoin and Arkon P-125

| | Example Number | | | |
| --- | --- | --- | --- | --- |
| | 1 | 2 | 3 | 4 |
| Component | Weight Percent | | | |
| .40IV PPE | 77.0 | 77.2 | 71.7 | 67.2 |
| KK-38 | 15.0 | 15.0 | 15.0 | 15.0 |
| Tuftec H1043 | 7.5 | 7.5 | 7.5 | 7.5 |
| Benzoin | 0.0 | 0.3 | 0.3 | 0.3 |
| Arkon P-125 | 0.0 | 0.0 | 5 | 10 |
| TDP | 0.5 | 0.5 | 0.5 | 0.5 |
| RDP | 0.0 | 0.0 | 0.0 | 0.0 |
| TOTAL | 100 | 100 | 100 | 100 |
| Physical Properties | | | | |
| Multiaxial Impact | 55.4 | 37.6 | 11.6 | 2.38 |
| HDT | 144 | 145 | 139 | 130 |
| Haze | 33.7 | 12.1 | 7.2 | 6.3 |
| % Transmittance | 71.1 | 82.1 | 83.1 | 83.7 |

Examples 5-8 are summarized in Table 1B. The resin of Example 5 was free of benzoin and Arkon P-125, as in Example 1, but contained 8 weight percent RDP. Comparing Example 5 to Example 1 shows that the multiaxial impact was reduced when RDP was present in the resin. When 0.3 weight percent of benzoin was added to the resin composition (Example 6), haze and percent transmittance improved compared to Example 5, but multiaxial impact resistance was reduced. This outcome was also observed in Example 7, where the resin contained both benzoin (0.3 weight percent) and Arkon P-125 (5 weight percent). Increasing the amount of Arkon P-125 to 10 weight percent (Example 8) also haze and percent transmittance compared to Example 7, but the multiaxial impact resistance was approximately the same.

TABLE 1B

Effect of Benzoin, Arkon P-125 and 8 Weight Percent of RDP

| Component | Example Number | | | |
|---|---|---|---|---|
| | 5 | 6 | 7 | 8 |
| | Weight Percent | | | |
| .40Iv PPE | 69.5 | 69.2 | 64.2 | 59.2 |
| KK-38 | 15 | 15 | 15 | 15 |
| Tuftec H1043 | 7.5 | 7.5 | 7.5 | 7.5 |
| Benzoin | 0.0 | 0.3 | 0.3 | 0.3 |
| Arkon P-125 | 0.0 | 0.0 | 5 | 10 |
| TDP | 0.5 | 0.5 | 0.5 | 0.5 |
| RDP | 8 | 8 | 8 | 8 |
| TOTAL | 100 | 100 | 100 | 100 |
| Physical Properties | | | | |
| Multiaxial Impact | 13.5 | 2.58 | 2.34 | 2.08 |
| HDT | 115 | 114 | 106 | 98.4 |
| Haze | 19.9 | 4.5 | 5.1 | 3.9 |
| % Transmittance | 71.1 | 81.3 | 82.4 | 83.4 |

Examples 9-12 are summarized in Table 1C. The resin of Example 9 was free of benzoin and Arkon P-125, as in Example 1, but contained 12 weight percent RDP. Comparing Example 9 to Examples 1 and 5 shows that the multiaxial impact resistance was reduced when RDP was present in the resin. When 0.3 weight percent of benzoin was added to the resin composition (Example 10), haze and percent transmittance compared to Example 9, but multiaxial impact resistance dropped. This finding was also observed in Example 11, where the resin contained both benzoin (0.3 weight percent) and Arkon P-125 (5 weight percent). Increasing the amount of Arkon P-125 to 10 weight percent (Example 12) also reduced haze and percent transmittance relative to Example 11, but the multiaxial impact resistance was approximately the same.

TABLE 1C

Effect of Benzoin, P-125, and 12 Weight Percent RDP

| Component | Example Number | | | |
|---|---|---|---|---|
| | 9 | 10 | 11 | 12 |
| | Weight Percent | | | |
| .40Iv PPE | 65.5 | 65.2 | 60.2 | 55.2 |
| KK-38 | 15.0 | 15 | 15 | 15 |
| Tuftec H1043 | 7.5 | 7.5 | 7.5 | 7.5 |
| Benzoin | 0.0 | 0.3 | 0.3 | 0.3 |
| Arkon P-125 | 0.0 | 0.0 | 5 | 10 |
| TDP | 0.5 | 0.5 | 0.5 | 0.5 |
| RDP | 12 | 12 | 12 | 12 |
| TOTAL | 100 | 100 | 100 | 100 |
| Physical Properties | | | | |
| Multiaxial Impact | 12.9 | 2.32 | 1.58 | 2.06 |
| HDT | 100 | 99.6 | 93.9 | 86.8 |
| Haze | 12.7 | 3.4 | 4.4 | 5.9 |
| % Transmittance | 70.9 | 81.9 | 83.1 | 83.2 |

In summary, in each of the resins containing 15 weight percent of KK-38 and 7.5 weight percent of Tuftec H1043, multiaxial impact resistance was reduced when any other additives were present. When benzoin and RDP were present, the resulting resins proved to have lower haze and higher percent transmittance compared to examples where these additives were absent.

Examples 13-24

Examples 13-24 contained 30 weight percent of KK-38 and 15 weight percent of Tuftec H1043. The ratio of KK-38 to Tuftec H1043 was maintained at 2 to 1 in each of the examples, but the amount of the other ingredients that were used was varied. In these samples, the addition of benzoin at 0.3 weight percent and Arkon P125 at either 5% or 10% weight percent loadings showed significant improvement in multiaxial impact. The results are summarized in Tables 2A, 2B, and 2C.

Table 2A summarizes the results for Examples 13-16. The resin of Example 13 ("Control") was free of benzoin and Arkon P-125. The multiaxial impact resistance of Example 13 was lower than in Example 1, where 15 weight percent of KK-38 and 7.5 weight percent of Tuftec H1043 were used. When 0.3 weight percent of benzoin was added to the resin composition (Example 14), haze and percent transmittance improved compared to Example 13, but multiaxial impact resistance did not. Compared to Example 14, multiaxial impact resistance improved in Example 15, where the resin contained both benzoin (0.3 weight percent) and Arkon P-125 (5 weight percent) and consequently less PPE (49.7 weight percent as compared to 55 weight percent). Increasing the amount of Arkon P-125 to 10 weight percent in Example 16 lead to a further improvement in multiaxial impact resistance relative to Example 13.

TABLE 2A

Effect of Benzoin and Arkon P-125

| Component | Example Number | | | |
|---|---|---|---|---|
| | 13 | 14 | 15 | 16 |
| | Weight Percent | | | |
| .40Iv PPE | 55 | 54.7 | 49.7 | 44.7 |
| KK-38 | 30 | 30 | 30 | 30.0 |
| Tuftec H1043 | 15 | 15 | 15 | 15.0 |
| Benzoin | 0.0 | 0.3 | 0.3 | 0.3 |
| Arkon P-125 | 0.0 | 0.0 | 5.0 | 10.0 |
| TDP | 0.5 | 0.5 | 0.5 | 0.5 |
| RDP | 0.0 | 0.0 | 0.0 | 0.0 |
| TOTAL | 100 | 100 | 100 | 100 |
| Physical Properties | | | | |
| Multiaxial Impact | 31.4 | 21.2 | 45.7 | 52.6 |
| HDT | 116 | 114 | 107 | 101 |
| Haze | 59.0 | 3.0 | 4.1 | 4.1 |
| % Transmittance | 77.8 | 83.6 | 83.9 | 84.3 |

Examples 17-20 are summarized in Table 2B. The resin of Example 17 was free of benzoin and Arkon P-125 (as in Example 13), but contained 8 weight percent RDP. When 0.3 weight percent of benzoin was added to the resin composition (Example 18), haze and percent transmittance improved compared to Example 17, but multiaxial impact resistance did not. Compared to Example 18, multiaxial impact resistance improved in Example 19, where the resin contained both benzoin (0.3 weight percent) and Arkon P-125 (5 weight percent) and consequently less PPE (41.7 weight percent as compared to 46.7 weight percent). Increasing the amount of Arkon P-125 to 10 weight percent in Example 20 lead to a further improvement in multiaxial impact resistance relative to Example 13.

TABLE 2B

Effect of Benzoin, Arkon P-125 and 8 Weight Percent of RDP

| Component | Example Number | | | |
|---|---|---|---|---|
| | 17 | 18 | 19 | 20 |
| | Weight Percent | | | |
| .40Iv PPE | 47 | 46.7 | 41.7 | 36.7 |
| KK-38 | 30 | 30 | 30 | 30 |
| Tuftec H1043 | 15 | 15 | 15 | 15 |
| Benzoin | 0.0 | 0.3 | 0.3 | 0.3 |
| Arkon P-125 | 0.0 | 0.0 | 5 | 10 |
| TDP | 0.5 | 0.5 | 0.5 | 0.5 |
| RDP | 8 | 8 | 8 | 8 |
| TOTAL | 100 | 100 | 100 | 100 |
| Physical Properties | | | | |
| Multiaxial Impact | 5.7 | 3.76 | 32.2 | 40.5 |
| HDT | 86.8 | 86 | 80.5 | 75.1 |
| Haze | 26.8 | 2.9 | 4.1 | 3.9 |
| Transmittance | 78.8 | 84.6 | 84.9 | 83.6 |

Examples 21-24 are summarized in Table 2C. The resin of Example 21 was free of benzoin and Arkon P-125 (as in Example 17), but contained 12 weight percent RDP. When 0.3 weight percent of benzoin was added to the resin composition (Example 22), haze and percent transmittance improved compared to Example 21, but multiaxial impact resistance did not. Multiaxial impact resistance improved in Example 23, where the resin contained both benzoin (0.3 weight percent) and Arkon P-125 (5 weight percent) and consequently less PPE (37.7 weight percent as compared to 42.7 weight percent), compared to Example 22. Increasing the amount of Arkon P-125 to 10 weight percent in Example 24 lead to a further improvement in multiaxial impact resistance relative to Example 13.

TABLE 2C

Effect of Benzoin, P-125, and 12 Weight Percent RDP

| Component | Example Number | | | |
|---|---|---|---|---|
| | 21 | 22 | 23 | 24 |
| | Weight Percent | | | |
| .40Iv PPE | 43 | 42.7 | 37.7 | 32.7 |
| KK-38 | 30 | 30 | 30 | 30 |
| Tuftec H1043 | 15 | 15 | 15 | 15 |
| Benzoin | 0.0 | 0.3 | 0.3 | 0.3 |
| Arkon P-125 | 0.0 | 0.0 | 5 | 10 |

TABLE 2C-continued

Effect of Benzoin, P-125, and 12 Weight Percent RDP

| Component | Example Number | | | |
|---|---|---|---|---|
| | 21 | 22 | 23 | 24 |
| | Weight Percent | | | |
| TDP | 0.5 | 0.5 | 0.5 | 0.5 |
| RDP | 12 | 12 | 12 | 12 |
| TOTAL | 100 | 100 | 100 | 100 |
| Physical Properties | | | | |
| Multiaxial Impact | 5.96 | 2.80 | 31.9 | 40.6 |
| HDT | 75.5 | 74.2 | 69.3 | 64.8 |
| Haze | 14.6 | 3.0 | 3.4 | 4.6 |
| % Transmittance | 78.8 | 84.7 | 84.7 | 83.4 |

In summary, in contrast to the resins containing 15 weight percent of KK-38 and 7.5 weight percent of Tuftec H1043, multiaxial impact resistance was greater in resins containing 30 weight percent of KK-38 and 15 weight percent of Tuftec H1043, when Arkon P-125 was present at any level, regardless of the presence of other additives, particularly benzoin and RDP. When benzoin and RDP were present, however, the resulting resins proved to maintain low haze and high percent transmittance.

Examples 25-51

The effects of benzoin loading versus the effect of the amount of Arkon or Clearon that was used was tested in Examples 25-51. These experiments generally indicate that a higher softening point helps multiaxial impact. The data is summarized in Table 3.

In Examples 25-33, the effect of benzoin loading versus Arkon P-125 loading was explored in samples containing 25 weight percent of KK-38 and 12.5 weight percent of Tuftec H1043, as well as TDP (0.5 weight percent), and RDP (12 weight percent). At 2.5 weight percent Arkon P-125, all samples showed low multiaxial impact regardless of the amount of benzoin present (Examples 25-27). At 5 and 7.5 weight percent Arkon P-125, multiaxial impact generally improved, while haze and percent transmittance remained relatively constant.

In Examples 34-42, the effect of benzoin loading versus Arkon P-140 loading was explored. The use of the Arkon P140, with a higher softening point than Arkon P-125 (140° C. versus 125° C.) helped the multiaxial impact. At 2.5 weight percent Arkon P-140, only the 0.3 weight percent benzoin sample showed low multiaxial impact (Example 34). As the amount of Arkon P-140 increased to 5 and then to 7.5 weight percent, all of the samples showed significant multiaxial impact improvement at all benzoin levels, while haze and percent transmittance remained relatively constant.

In Examples 43-51 the effect of benzoin loading versus Clearon P-150 loading was observed. The higher softening point of Clearon P-150 (152° C.) provided overall improved multiaxial impact at all levels of Clearon P-150, independent of benzoin level while haze and percent transmittance remained relatively constant.

TABLE 3

| | Example No. | | | | | | | | |
|---|---|---|---|---|---|---|---|---|---|
| | 25 | 26 | 27 | 28 | 29 | 30 | 31 | 32 | 33 |
| .40Iv PPE | 47.2 | 47 | 46.8 | 44.7 | 44.5 | 44.3 | 42.2 | 42 | 41.8 |
| KK-38 | 25 | 25 | 25 | 25 | 25 | 25 | 25 | 25 | 25 |
| Tuftec H1043 | 12.5 | 12.5 | 12.5 | 12.5 | 12.5 | 12.5 | 12.5 | 12.5 | 12.5 |
| Benzoin | 0.3 | 0.5 | 0.7 | 0.3 | 0.5 | 0.7 | 0.3 | 0.5 | 0.7 |
| Arkon P-125 | 2.5 | 2.5 | 2.5 | 5 | 5 | 5 | 7.5 | 7.5 | 7.5 |
| TDP | 0.5 | 0.5 | 0.5 | 0.5 | 0.5 | 0.5 | 0.5 | 0.5 | 0.5 |
| RDP | 12 | 12 | 12 | 12 | 12 | 12 | 12 | 12 | 12 |
| TOTAL | 100 | 100 | 100 | 100 | 100 | 100 | 100 | 100 | 100 |
| Multiaxial Impact | 3.12 | 5.46 | 5.94 | 43.3 | 21.8 | 6.9 | 43.3 | 41.4 | 46.7 |
| Haze | 4.8 | 3.7 | 3.5 | 3.5 | 3.4 | 3.5 | 3.6 | 3.6 | 3.8 |
| % Transmittance | 81.6 | 82.3 | 82.5 | 82.3 | 82.8 | 82.9 | 82.5 | 82.7 | 82.7 |

| | Example No. | | | | | | | | |
|---|---|---|---|---|---|---|---|---|---|
| | 34 | 35 | 36 | 37 | 38 | 39 | 40 | 41 | 42 |
| .40Iv PPE | 47.2 | 47 | 46.8 | 44.7 | 44.5 | 44.3 | 42.2 | 42 | 41.8 |
| KK-38 | 25 | 25 | 25 | 25 | 25 | 25 | 25 | 25 | 25 |
| Tuftec H1043 | 12.5 | 12.5 | 12.5 | 12.5 | 12.5 | 12.5 | 12.5 | 12.5 | 12.5 |
| Benzoin | 0.3 | 0.5 | 0.7 | 0.3 | 0.5 | 0.7 | 0.3 | 0.5 | 0.7 |
| Arkon P-140 | 2.5 | 2.5 | 2.5 | 5 | 5 | 5 | 7.5 | 7.5 | 7.5 |
| TDP | 0.5 | 0.5 | 0.5 | 0.5 | 0.5 | 0.5 | 0.5 | 0.5 | 0.5 |
| RDP | 12 | 12 | 12 | 12 | 12 | 12 | 12 | 12 | 12 |
| TOTAL | 100 | 100 | 100 | 100 | 100 | 100 | 100 | 100 | 100 |
| Multiaxial Impact | 5.66 | 39.4 | 24.9 | 29.9 | 44.2 | 36.6 | 51.3 | 38.5 | 41.7 |
| Haze | 3.3 | 4.1 | 3.6 | 3.8 | 3.9 | 4.1 | 3.6 | 3.6 | 3.8 |
| % Transmittance | 82.6 | 82.6 | 82.4 | 82.2 | 82.6 | 82.7 | 82.0 | 82.8 | 82.8 |

| | Example No. | | | | | | | | |
|---|---|---|---|---|---|---|---|---|---|
| | 43 | 44 | 45 | 46 | 47 | 48 | 49 | 50 | 51 |
| .40Iv PPE | 47.2 | 47 | 46.8 | 44.7 | 44.5 | 44.3 | 42.2 | 42 | 41.8 |
| KK-38 | 25 | 25 | 25 | 25 | 25 | 25 | 25 | 25 | 25 |
| Tuftec H1043 | 12.5 | 12.5 | 12.5 | 12.5 | 12.5 | 12.5 | 12.5 | 12.5 | 12.5 |
| Benzoin | 0.3 | 0.5 | 0.7 | 0.3 | 0.5 | 0.7 | 0.3 | 0.5 | 0.7 |
| Clearon P-150 | 2.5 | 2.5 | 2.5 | 5 | 5 | 5 | 7.5 | 7.5 | 7.5 |
| TDP | 0.5 | 0.5 | 0.5 | 0.5 | 0.5 | 0.5 | 0.5 | 0.5 | 0.5 |
| RDP | 12 | 12 | 12 | 12 | 12 | 12 | 12 | 12 | 12 |
| TOTAL | 100 | 100 | 100 | 100 | 100 | 100 | 100 | 100 | 100 |
| Multiaxial Impact | 35.4 | 28.5 | 34.4 | 54.1 | 53.1 | 51.6 | 51.9 | 49.4 | 48.5 |
| Haze | 4.6 | 3.8 | 3.5 | 3.6 | 3.8 | 3.7 | 3.9 | 4.4 | 4.3 |
| % Transmittance | 81.3 | 82.2 | 82.6 | 82.2 | 82.8 | 82.6 | 81.6 | 82.1 | 82.3 |

Effect of Downstream or Upstream Addition of KK-38 and Tuftec H1043:

This experiment was designed to determine the optimal point during the process to add the impact modifier KK-38. All samples were prepared on a Werner Pfleiderer twin screw 30 mm extruder. The blend components were 0.46 IV PPE at either 85 or 70 weight percent and KK-38 and Tuftec H1043 used in a 1:1 ratio (either 7.5 weight percent or 15 weight percent each respectively). All three of the blend components were added at the feed throat of the extruder ("upstream") in half of the examples. In the other half of the examples, 0.46 IV PPE and Tuftec H1043 were added upstream, and KK38 was added at the 6$^{th}$ barrel of the extruder ("downstream"). Extrusion temperatures were set at 240° C., 250° C., 260° C., 260° C., 260° C. and 250° C. from feed throat to die. The extruder was run at 350 RPM with a 40 pound/hour feed rate and full vacuum on barrel 9.

All samples were molded on a 170 tom 8.5 oz barrel Van-dorn molder. Temperatures were set at 450° F. for the barrel and 150° F. for the mold. A 4.4" shot with 0.5" cutoff and 2'/second velocity was used. The molded tree consisted of 2-4"×⅛" plaques, 2 type I tensile bars, 2 Izod bars and 2½"× 5"×⅛" bars.

Table 4 summarizes the results of Examples 52-59. In Examples 52, 54, 56, and 58, KK38 was added downstream. These examples showed substantial improvement in haze compared to Examples 53, 55, 57, and 59, where KK-38 was added upstream.

TABLE 4

Effect of Upstream Versus Downstream Addition KK-38

| | Example | | | | | | | |
|---|---|---|---|---|---|---|---|---|
| Ingredient | 52 | 53 | 54 | 55 | 56 | 57 | 58 | 59 |
| | Percent of Composition by Weight | | | | | | | |
| .46 IV PPE | 85 | 85 | 85 | 85 | 70 | 70 | 70 | 70 |
| KK-38 Up Stream | — | 7.5 | — | 7.5 | — | 15 | — | 15 |
| KK-38 Down Stream | 7.5 | — | 7.5 | — | 15 | — | 15 | — |
| Tuftec Up stream | 7.5 | 7.5 | — | — | 15 | 15 | — | — |
| Tuftec Down Stream | — | — | 7.5 | 7.5 | — | — | 15 | 15 |

TABLE 4-continued

Effect of Upstream Versus Downstream Addition KK-38

| Ingredient | 52 | 53 | 54 | 55 | 56 | 57 | 58 | 59 |
|---|---|---|---|---|---|---|---|---|
| Properties | | | | | | | | |
| Multiaxial Impact | 55.3 | 43.3 | 40.5 | 43.6 | 43.5 | 12.6 | 35.5 | 12 |
| Haze (%) | 8.7 | 76.5 | 6.3 | 70.1 | 21.5 | 60.5 | 20.8 | 62.6 |
| Light Transmittance (%) | 63.8 | 62.1 | 63.6 | 64.6 | 64.3 | 58.6 | 65.7 | 58.3 |

The foregoing invention has been described in some detail by way of illustration and example for purposes of clarity and understanding. The invention has been described with reference to various specific embodiments and techniques. It should be understood that many variations and modifications may be made while remaining within the spirit and scope of the invention. It will be obvious to one of skill in the art that changes and modifications may be practiced within the scope of the appended claims. The above description is intended to be illustrative and not restrictive. The scope of the invention should, therefore, be determined not with reference to the above description, but should instead be determined with reference to the following appended claims, along with the full scope of equivalents to which such claims are entitled. All patents, patent applications, and publications cited in this application are hereby incorporated by reference in their entirety for all purposes to the same extent as if each individual patent, patent application, or publication were so individually denoted.

What is claimed is:

1. A composition comprising:
   (a) a poly(arylene ether);
   (b1) a radial block copolymer of an alkenyl aromatic monomer and a conjugated diene; wherein the radial block copolymer has 50 to 70 weight percent of repeating units derived from the alkenyl aromatic monomer and a number average molecular weight of 50,000 to 70,000 atomic units;
   (b2) a linear block copolymer of an alkenyl aromatic monomer and a conjugated diene; wherein the linear block copolymer has 55 to 70 weight percent of repeating units derived from the alkenyl aromatic monomer; wherein the ratio of (b1) to (b2) is 0.5:1 to 4:1;
   (c) one or more optical enhancing agents; and
   (d) a hydrocarbon resin selected from the group consisting of hydrogenated alicyclic hydrocarbon resins and hydrogenated terpene resins;
   wherein the composition is characterized by one or more of the following properties:
   (i) a multiaxial impact of at least 20 J as measured by ASTM D 3763-08;
   (ii) a percent haze of 15 percent or less as measured by ASTM D 1003-00; and
   (iii) a percent transmittance of 75 percent or more as measured by ASTM D 1003-00.

2. The composition of claim 1, wherein:
   (a) the poly(arylene ether) comprises a poly(phenylene ether);
   (b1) has 65 to 70 weight percent of repeating units derived from the alkenyl aromatic monomer; wherein the alkenyl aromatic monomer is styrene and the conjugated diene is butadiene;
   (b2) has 65 to 70 weight percent of repeating units derived from the alkenyl aromatic monomer; wherein the linear block copolymer is a polystyrene-poly(ethylene-butylene)-polystyrene triblock copolymer; and wherein the ratio of (b1) to (b2) is from 1.5:1 to 2.5:1;
   (c) comprises benzoin (c1) and tridecyl phosphite (c2, TDP); and
   (d) has a softening point of 120 to 155° C. measured according to ASTM E28-99(2009);
   further comprising a non-halogenated flame retardant (e) selected from the group consisting of resorcinol bis(diphenyl phosphate) (RDP) and bisphenol A bis(diphenyl phosphate) (BPADP).

3. The composition of claim 2, wherein (e) is RDP.

4. The composition of claim 2, wherein the weight percent ratio of (b1) to (b2) is 1.75:1 to 2.25:1.

5. The composition of claim 2, wherein the weight percent ratio of (b1) to (b2) is 1.9:1 to 2.1:1.

6. The composition of claim 1, wherein the poly(arylene ether) comprises 2,6-dimethyl-1,4-phenylene ether units, 2,3,6-trimethyl-1,4-phenylene ether units, or a combination thereof.

7. The composition of claim 6, further comprising (e) a flame retardant.

8. The composition of claim 7, wherein (e) is a halogenated flame retardant or a phosphorous-containing flame retardant.

9. The composition of claim 8, wherein (e) is a phosphorous-containing flame retardant selected from the group consisting of resorcinol bis(diphenyl phosphate) (RDP) and bisphenol A bis(diphenyl phosphate) (BPADP).

10. The composition of claim 6, comprising:
    30 to 60 weight percent of (a);
    20 to 36 weight percent of (b1);
    10 to 18 weight percent of (b2) wherein the ratio of weight percents of (b1) to (b2) is 1.75:1 to 2.25:1;
    0.1 to 1 weight percent of (c); and
    2 to 15 weight percent of (d) wherein (d) has a softening point of 135 to 155° C. measured according to ASTM E28-99(2009), or 4 to 15 weight percent of (d) wherein (d) has a softening point of 120 to 130° C. measured according to ASTM E28-99(2009); wherein the composition has a multiaxial impact of at least 20 J as measured by ASTM D 3763-08 and is characterized by one or more of the following properties:
    (i) a percent haze of 15 percent or less as measured by ASTM D 1003-00; and
    (ii) a percent transmittance of 75 percent or more as measured by ASTM D 1003-00.

11. The composition of claim 10, further comprising (e) a flame retardant.

12. The composition of claim 11, wherein:
    (b1) has 65 to 70 weight percent of repeating units derived from the alkenyl aromatic monomer; wherein the alkenyl aromatic monomer is styrene and the conjugated diene is butadiene;
    (b2) has 65 to 70 weight percent of repeating units derived from the alkenyl aromatic monomer; wherein the linear block copolymer is a polystyrene-poly(ethylene-butylene)-polystyrene triblock copolymer; and
    (c) is benzoin.

13. The composition of claim 12, further comprising from 0.1 to 0.6 weight percent of TDP.

14. The composition of claim 6, comprising:
    30 to 60 weight percent of (a);
    12 to 36 weight percent of (b1);
    6 to 18 weight percent of (b2) wherein the weight percent ratio of (b1) to (b2) is 1.75:1 to 2.25:1;

0.1 to 1 weight percent of (c); and
2 to 15 weight percent of (d).

15. The composition of claim 14, wherein (c) comprises (c1) and (c2), wherein:
(c1) is an alpha-hydroxyketone selected from the group consisting of hydroxyacetone (1-hydroxy-2-propanone; Chemical Abstracts Service (CAS) Reg. No. 116-09-6), acetoin (3-hydroxy-2-butanone; CAS Reg. No. 513-86-0), 2-hydroxyacetophenone (CAS Reg. No. 528-24-1), benzoin (2-hydroxy-2-phenylacetophenone CAS Reg. No. 119-53-9), 2-hydroxy-1-phenyl-2-p-tolyl-ethanone (CAS Reg. No. 2431-02-9); and
(c2) is a trihydrocarbyl phosphites $P(OR^{11})_3$, wherein each occurrence of $R^{11}$ is independently $C_1$-$C_{18}$ hydrocarbyl, wherein (c2) is selected from the group consisting of trioctyl phosphite, tridecyl phosphite, tridodecyl phosphite, phenyl didecyl phosphite, decyl diphenyl phosphite, triphenyl phosphite, and tritolyl phosphite.

16. The composition of claim 14, wherein (d) has a softening point of 120 to 155° C. measured according to ASTM E28-99(2009).

17. The composition of claim 16, wherein:
(b1) has 65 to 70 weight percent of repeating units derived from the alkenyl aromatic monomer; wherein the alkenyl aromatic monomer is styrene and the conjugated diene is butadiene;
(b2) has 65 to 70 weight percent of repeating units derived from the alkenyl aromatic monomer; wherein the linear block copolymer is a polystyrene-poly(ethylene-butylene)-polystyrene triblock copolymer; and
(c) is benzoin;
further comprising 0.01 to 0.6 weight percent of TDP and 0 to 15 weight percent of RDP.

18. The composition of claim 15, wherein (c1) is benzoin and (c2) is selected from the group consisting of trioctyl phosphite, tridecyl phosphite (TDP), tridodecyl phosphite, phenyl didecyl phosphite, decyl diphenyl phosphite, triphenyl phosphite, and tritolyl phosphite.

19. The composition of claim 18, comprising 0.2 to 0.9 weight percent of benzoin (c1) and 0.01 to 0.6 weight percent of (c2) wherein (c2) is TDP.

20. The composition of claim 14, further comprising (e) a flame retardant.

21. The composition of claim 20, wherein (e) is a halogenated flame retardant or a phosphorous-containing flame retardant.

22. The composition of claim 21, wherein (e) is resorcinol bis(diphenyl phosphate) (RDP) or bisphenol A bis(diphenyl phosphate) (BPADP).

23. The composition of claim 6, wherein the ratio of (b1) to (b2) is 1:1 to 3:1.

24. The composition of claim 23, wherein (c) comprises (c1) and (c2), wherein:
(c1) is an alpha-hydroxyketone selected from the group consisting of hydroxyacetone (1-hydroxy-2-propanone; Chemical Abstracts Service (CAS) Reg. No. 116-09-6), acetoin (3-hydroxy-2-butanone; CAS Reg. No. 513-86-0), 2-hydroxyacetophenone (CAS Reg. No. 528-24-1), benzoin (2-hydroxy-2-phenylacetophenone CAS Reg. No. 119-53-9), 2-hydroxy-1-phenyl-2-p-tolyl-ethanone (CAS Reg. No. 2431-02-9); and
(c2) is a trihydrocarbyl phosphites $P(OR^{11})_3$, wherein each occurrence of $R^{11}$ is independently $C_1$-$C_{18}$ hydrocarbyl, wherein (c2) is selected from the group consisting of trioctyl phosphite, tridecyl phosphite, tridodecyl phosphite, phenyl didecyl phosphite, decyl diphenyl phosphite, triphenyl phosphite, and tritolyl phosphite.

25. The composition of claim 24, comprising
41.0 to 48.7 weight percent of (a);
24 to 26 weight percent of (b1);
12 to 13 weight percent of (b2), provided that the ratio of (b1) to (b2) is 1.75:1 to 2.25:1;
0.2 to 0.4 weight percent of (c1);
0.1 to 0.6 weight percent of (c2);
2 to 15 weight percent of (d) wherein (d) has a softening point of 135 to 155° C. measured according to ASTM E28-99(2009), or 4 to 15 weight percent of (d) wherein (d) has a softening point of 120 to 130° C. measured according to ASTM E28-99(2009); and
further comprising 11 to 13 weight percent RDP;
based on a composition comprising 100 percent by weight of (a), (b1), (b2), (c1), (c2), (d), and (e), and wherein the composition has a multiaxial impact of at least 20 J as measured by ASTM D 3763-08 and is characterized by one or more of the following properties:
(i) a percent haze of 15 percent or less as measured by ASTM D 1003-00; and
(ii) a percent transmittance of 75 percent or more as measured by ASTM D 1003-00.

26. The composition of claim 25, wherein the ratio of (b1) to (b2) is 1.9:1 to 2.1:1.

27. The composition of claim 26, wherein:
(b1) has 65 to 70 weight percent of repeating units derived from the alkenyl aromatic monomer; wherein the alkenyl aromatic monomer is styrene and the conjugated diene is butadiene;
(b2) has 65 to 70 weight percent of repeating units derived from the alkenyl aromatic monomer; wherein the linear block copolymer is a polystyrene-poly(ethylene-butylene)-polystyrene triblock copolymer;
(c1) is benzoin; and
(c2) is TDP.

28. The composition of claim 24, wherein (c1) is benzoin and (c2) is selected from the group consisting of trioctyl phosphite, tridecyl phosphite (TDP), tridodecyl phosphite, phenyl didecyl phosphite, decyl diphenyl phosphite, triphenyl phosphite, and tritolyl phosphite.

29. The composition of claim 28, wherein the hydrocarbon resin (d) has a softening point of 120 to 155° C. measured according to ASTM E28-99(2009).

30. The composition of claim 29, further comprising one or more additives selected from the group consisting of stabilizers, mold release agents, processing aids, drip retardants, nucleating agents, UV blockers, dyes, pigments, antioxidants, anti-static agents, blowing agents, mineral oil, metal deactivators, antiblocking agents, and the like, and combinations thereof.

31. The composition of claim 30, further comprising a filler selected from the group consisting of nanotalcs, fumed silicas, and nanoclays.

32. A composition, comprising:
41.0 to 48.7 weight percent of a poly(phenylene ether);
24 to 26 weight percent of a radial block copolymer of styrene and butadiene;
wherein the radial block copolymer has 65 to 70 weight percent of repeating units derived from styrene and a number average molecular weight of 50,000 to 70,000 atomic units;
12 to 13 percent of a linear block copolymer of an alkenyl aromatic monomer and a conjugated diene; wherein the linear block copolymer has 65 to 70 weight percent of repeating units derived from the alkenyl aromatic monomer; wherein the linear block copolymer is a polystyrene-poly(ethylene-butylene)-polystyrene triblock copolymer; provided that the ratio of the radial block copolymer to the linear block copolymer is 2.25:1 to 1.75:1;

0.2 to 0.4 weight percent of benzoin;

0.1 to 0.6 weight percent of TDP;

a hydrocarbon resin selected from the group consisting of hydrogenated alicyclic hydrocarbon resins and hydrogenated terpene resins, in an amount of 2 to 15 weight percent wherein the hydrocarbon resin has a softening point of 135 to 155° C. measured according to ASTM E28-99(2009), or in an amount of 4 to 15 weight percent of wherein the hydrocarbon resin has a softening point of 120 to 130° C. measured according to ASTM E28-99 (2009); and 11 to 13 weight percent RDP;

based on a composition comprising 100 percent by weight, and wherein the composition has a multiaxial impact of at least 20 J as measured by ASTM D 3763-08 and is characterized by one or more of the following properties:
  (i) a percent haze of 15 percent or less as measured by ASTM D 1003-00; and
  (ii) a percent transmittance of 75 percent or more as measured by ASTM D 1003-00.

33. The composition of claim 32, wherein the ratio the radial block copolymer to the linear block copolymer is 1.9:1 to 2.1:1.

34. A process for preparing the composition of claim 1, comprising:
  (1) combining (a), (c), (b2), and (d) in the feed throat of an extruder to form a first mixture;
  (2) extruding the first mixture at a temperature of 220 to 280° C.; and
  (3) adding (b1) to the extruding mixture as it progresses from the extruder feed throat toward the die to form a second mixture.

35. The process of claim 34, wherein the first mixture further comprises (e) a flame retardant selected from the group consisting of resorcinol bis(diphenyl phosphate) (RDP) and bisphenol A bis(diphenyl phosphate) (BPADP) to the first mixture during step (2).

36. The process of claim 34, wherein the first mixture comprises:
  (a) a poly(arylene ether) comprising a poly(phenylene ether);
  (b2) a polystyrene-poly(ethylene-butylene)-polystyrene triblock copolymer having 65 to 70 weight percent of repeating units derived from styrene;
  (c) benzoin (c1) and TDP (c2); and
  (d) a hydrocarbon resin having a softening point of 120 to 155° C. measured according to ASTM E28-99(2009).

37. The process of claim 34, wherein the second mixture comprises:
  (a) a poly(arylene ether) comprising a poly(phenylene ether);
  (b1) a radial block copolymer of styrene and butadiene; wherein the radial block copolymer has 65 to 70 weight percent of repeating units derived from styrene;
  (b2) a polystyrene-poly(ethylene-butylene)-polystyrene triblock copolymer having 65 to 70 weight percent of repeating units derived from styrene;
  (c) benzoin (c1) and tridecyl phosphite (c2, TDP);
  (d) a hydrocarbon resin having a softening point of 120 to 155° C. measured according to ASTM E28-99(2009); and
  (e) a non-halogenated flame retardant selected from the group consisting of resorcinol bis(diphenyl phosphate) (RDP) and bisphenol A bis(diphenyl phosphate) (BPADP).

38. The process of claim 37, wherein the second mixture comprises:
  30 to 60 weight percent of (a);
  20 to 36 weight percent of (b1);
  10 to 18 weight percent of (b2); provided that the ratio of weight percents of (b1) to (b2) is in the range of 2.25:1 to 1.75:1;
  0.1 to 1 weight percent of (c1);
  0.1 to 0.7 weight percent of (c2);
  4 to 15 weight percent of (d); and
  0 to 15 weight percent of (e).

39. An article comprising the composition of claim 1.

40. The article of claim 39, which is a container or a protective covering.

* * * * *